(12) United States Patent
Konno et al.

(10) Patent No.: US 10,663,812 B2
(45) Date of Patent: May 26, 2020

(54) LIQUID CRYSTAL DISPLAY DEVICE

(71) Applicant: Tianma Japan, Ltd., Kanagawa (JP)

(72) Inventors: Takayuki Konno, Kanagawa (JP);
Hidenori Ikeno, Kanagawa (JP);
Mitsuhiro Sugimoto, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 0 days.

(21) Appl. No.: 16/423,808

(22) Filed: May 28, 2019

(65) Prior Publication Data

US 2019/0361302 A1 Nov. 28, 2019

(30) Foreign Application Priority Data

May 28, 2018 (JP) .................................. 2018-101624
Mar. 20, 2019 (JP) .................................. 2019-052629

(51) Int. Cl.
*G02F 1/1343* (2006.01)
*G02F 1/1368* (2006.01)
*G09G 3/36* (2006.01)

(52) U.S. Cl.
CPC ...... *G02F 1/134309* (2013.01); *G02F 1/1368* (2013.01); *G09G 3/3648* (2013.01); *G02F 2201/121* (2013.01); *G02F 2201/123* (2013.01); *G02F 2201/128* (2013.01); *G09G 2300/0426* (2013.01); *G09G 2300/0439* (2013.01)

(58) Field of Classification Search
CPC ......................... G02F 1/134309; G02F 1/1368
See application file for complete search history.

(56) References Cited

U.S. PATENT DOCUMENTS 6,452,657 B1 9/2002 Suzuki et al.
2013/0033666 A1* 2/2013 Chung .............. G02F 1/133707
349/126

* cited by examiner

*Primary Examiner* — James A Dudek
(74) *Attorney, Agent, or Firm* — Young & Thompson

(57) ABSTRACT

A driving potential is given to the first electrodes and the third electrodes, respectively. A common potential is given to the second electrodes and the fourth electrodes, respectively. Each of the third electrodes is located at a layer closer to the liquid crystal as compared to the second electrodes, and intersects with one of the second electrodes through an insulating layer. Each of the fourth electrodes is located at a layer closer to the liquid crystal as compared to the first electrodes, and intersects with one of the first electrodes through an insulating layer. A width of the third electrodes is the same as each other at respective intersections of the the third electrodes and the the second electrodes. A width of the fourth electrodes is the same as each other at respective intersections of the the fourth electrodes and the the first electrodes.

18 Claims, 33 Drawing Sheets

LIQUID CRYSTAL DISPLAY DEVICE

CROSS-REFERENCE TO RELATED APPLICATIONS

This Non-provisional application claims priority under 35 U.S.C. § 119(a) on Patent Application No. 2018-101624 filed in Japan on May 28, 2018 and Patent Application No. 2019-52629 filed in Japan on Mar. 20, 2019, the entire contents of which are hereby incorporated by reference.

BACKGROUND

The present disclosure relates to a liquid crystal display device. Liquid crystal display devices are used in various fields for being thin and light-weighted. In particular, the number of liquid crystal display devices installed in a vehicle is increasing as automobiles are equipped with more electronics. In many cases, if the display device needs to have a wide viewing angle, a lateral electric field liquid crystal display device is used.

Because automobiles are used in a very wide range of temperature, the required operation temperature range for a liquid crystal display device is −30 degrees C. to 80 degrees C., which is very wide. Recently, some vehicles have started to use liquid crystal display devices for side mirrors, a rear-view mirror, and the like. Because the liquid crystal display device needs to smoothly display an image from a camera installed outside the vehicle, a sufficient level of response speed is required in the overall temperature range.

The response speed of the liquid crystal display device slows down as the temperature goes down, but the liquid crystal display device is required to have a response speed necessary to display a video even in a low temperature range. The response speed is generally represented by the sum ($\tau on+\tau off$) of the leading time ($\tau on$) and the trailing time ($\tau off$). Thus, it is necessary to reduce both the leading time and trailing time.

The response speed is improved by reducing the viscosity of the liquid crystal material or reducing the gap in the liquid crystal layer. However, those methods are not enough to achieve a sufficient response speed. When a pixel voltage is applied (ON period), the response speed of the liquid crystal is determined by the relationship between the elastic energy of the liquid crystal and the resistant voltage. When no voltage is applied (OFF period), the response speed of the liquid crystal is the recovery speed of the liquid crystal by the elastic energy. The leading time can be reduced with the overdrive. On the other hand, the trailing speed is determined by the natural recovery force of the elasticity, and with a normal cell structure, it is not easy to reduce the recovery speed.

The starting point of the recovery of the liquid crystal from the OFF state is the liquid crystal molecules having a fixed orientation by alignment films each disposed above and below the liquid crystal layer. Thus, by increasing the number of this starting point to help the liquid crystal molecules return to the initial state, the liquid crystal can recover from the OFF state faster, which improves the response speed. In relation to this point, U.S. Pat. No. 6,452,657 discloses a specific IPS (in-plane switching) structure, for example. In this structure, the orientation of the liquid crystal molecules in the sub-sections surrounded by the driving electrode and common electrode in each pixel differs from each other, and because the liquid crystal molecules in the borders of the sub-sections that do not rotate and remain stable function as walls, it is possible to improve the response speed.

SUMMARY

An aspect of the present disclosure is a liquid crystal display device, including: an element substrate; an opposite substrate facing the element substrate; liquid crystal sandwiched between the element substrate and the opposite substrate; and a plurality of electrode sets formed on a surface of the element substrate facing the liquid crystal, the plurality of electrode sets being configured to apply an electric field to each pixel region of the liquid crystal. Each of the plurality of electrode sets includes: a plurality of first electrodes extending along an orientation axis of the liquid crystal and arranged along a second axis perpendicular to the orientation axis at a certain interval; a plurality of second electrodes extending along the orientation axis and arranged along the second axis so that the plurality of second electrodes and the plurality of first electrodes alternately line up at a certain interval; a plurality of third electrodes extending along the second axis and arranged along the orientation axis at a certain interval; and a plurality of fourth electrodes extending along the second axis and arranged along the orientation axis so that the plurality of fourth electrodes and the plurality of third electrodes alternately line up at a certain interval. A driving potential is given to the plurality of first electrodes and the plurality of third electrodes, respectively. A common potential is given to the plurality of second electrodes and the plurality of fourth electrodes, respectively. Each of the plurality of third electrodes is located at a layer closer to the liquid crystal as compared to the plurality of second electrodes, and intersects with one of the plurality of second electrodes through an insulating layer. Each of the plurality of fourth electrodes is located at a layer closer to the liquid crystal as compared to the plurality of first electrodes, and intersects with one of the plurality of first electrodes though an insulating layer. A width of the third electrodes is the same as each other at respective intersections of the plurality of the third electrodes and the plurality of the second electrodes. A width of the fourth electrodes is the same as each other at respective intersections of the plurality of the fourth electrodes and the plurality of the first electrodes.

It is to be understood that both the foregoing general description and the following detailed description are exemplary and explanatory and are not restrictive of the present disclosure.

DETAILED DESCRIPTION OF THE EMBODIMENTS

Hereinafter, embodiments of the present disclosure will be described with reference to the accompanying drawings. It should be noted that the embodiments are merely examples to implement the features of the present disclosure and are not to limit the technical scope of the present disclosure.

Embodiment 1

Figure 1:
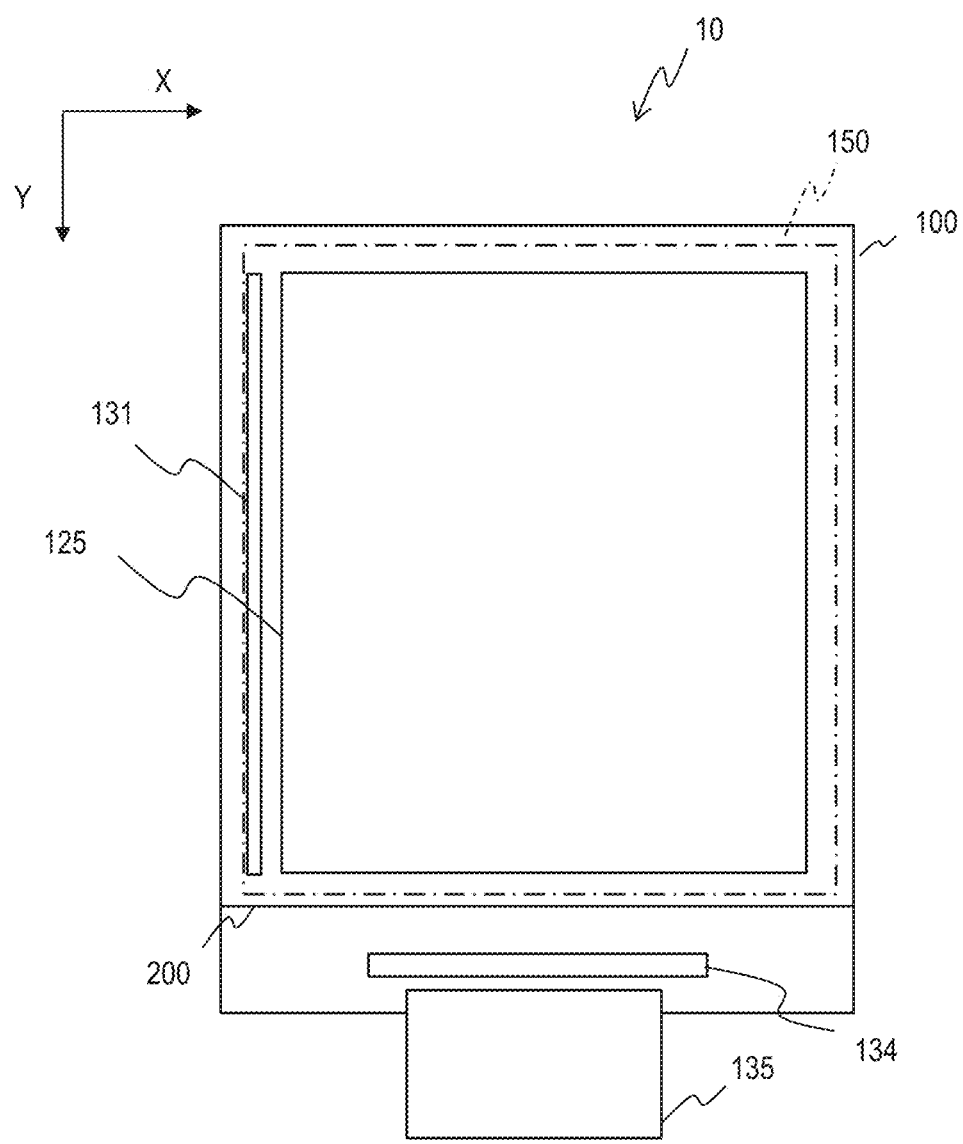
FIG. 1 schematically illustrates a configuration example of a liquid crystal display device.

FIG. 1 schematically illustrates a configuration example of a liquid crystal display device 10. The liquid crystal display device 10 includes a liquid crystal display panel and a control device. The liquid crystal display panel includes a TFT (thin film transistor) substrate 100 in which electrodes are formed to apply an electric field to thin film transistors and liquid crystal, an opposite substrate 200, and a sealing portion 150 that puts together the TFT substrate 100 and the opposite substrate 200. A liquid crystal material is sealed between the TFT substrate 100 and the opposite substrate 200.

Outside a display region 125 of the TFT substrate 100, a scan driver 131 and a driver IC 134 are disposed. The driver IC 134 is connected to an external device via FPC (flexible printed circuit) 135. The scan driver 131 and the driver IC are part of the control device.

The scan driver 131 drives scan lines of the TFT substrate 100. The driver IC 134 is mounted using an anisotropic conductive film (ACF), for example. The driver IC 134 provides the scan driver 131 with power and a timing signal (control signal), and also provides data lines with a signal corresponding to the image data. That is, the driver IC 134 has the display control function.

Figure 2:
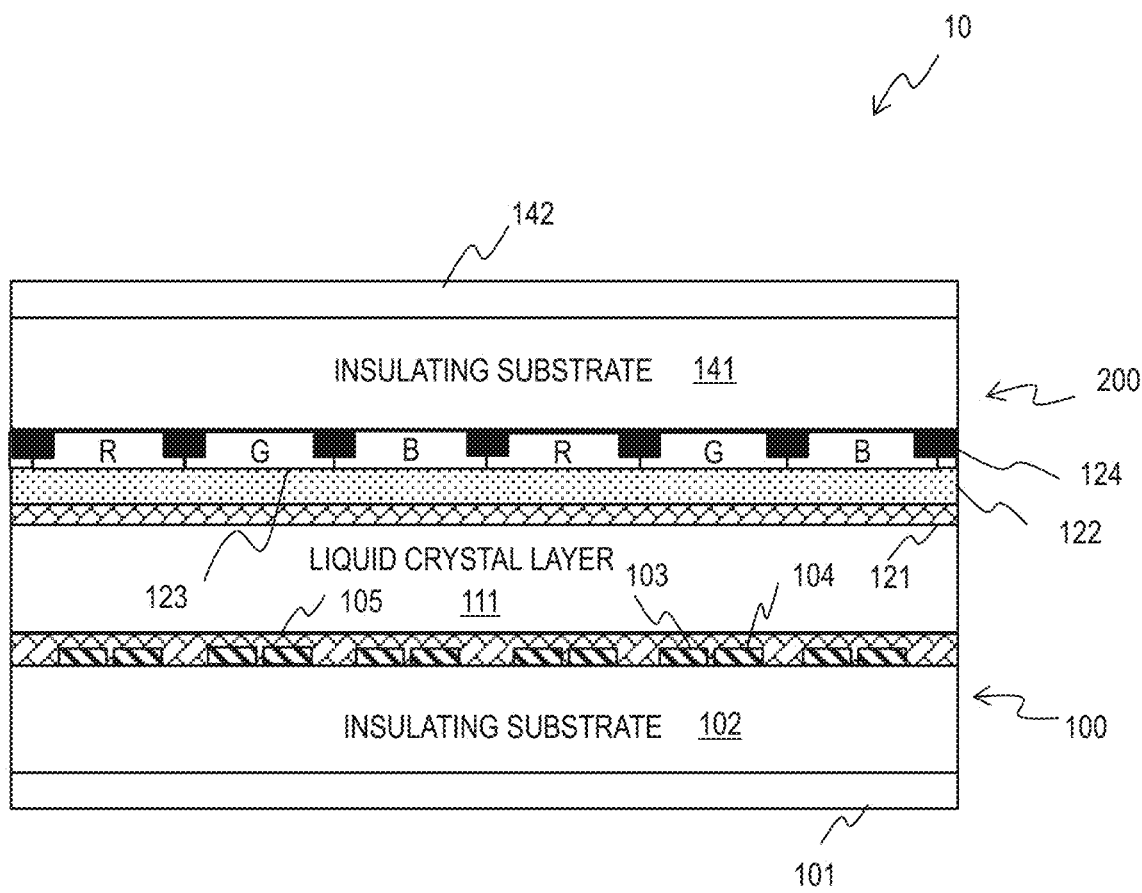
FIG. 2 schematically illustrates a cross-sectional structure of the liquid crystal display device.

FIG. 2 schematically illustrates a cross-sectional structure of the liquid crystal display device 10. FIG. 2 illustrates part of the structure of the liquid crystal display device 10, and some configurations such as a backlight unit are not included. The liquid crystal display panel includes the TFT substrate 100, and the opposite substrate 200 facing the TFT substrate 100. A liquid crystal layer 111 is sandwiched between the TFT substrate 100 and the opposite substrate 200. The liquid crystal display device 10 also includes a backlight unit, which is not illustrated in the figure.

The TFT substrate 100 includes an insulating substrate 102. The insulating substrate 102 is an insulating transparent substrate made of a glass or resin. The insulating substrate 102 is in a rectangular shape, for example, and one primary surface thereof faces one primary surface of the opposite substrate 200. A polarizing plate 101 is placed over the other primary surface of the insulating substrate 102 on the side opposite to the liquid crystal layer 111.

On the primary surface of the insulating substrate 102 facing the liquid crystal layer 111, driving electrodes (also referred to as pixel electrodes) 103 that apply electric field to the liquid crystal layer 111 and common electrodes (also referred to as opposite electrodes) 104 are arranged. One pair of the driving electrode 103 and common electrode 104 applies electric field to the liquid crystal of one pixel. The amount of light that transmits the pixel changes depending on the applied electric field. On the insulating substrate 102, a TFT array, not shown in the figure, is formed to select pixels to be controlled.

The configuration example illustrated in FIG. 2 is a lateral electric field driving liquid crystal display device. Examples of the lateral electric field driving liquid crystal display device include IPS (in-plane switching) and FFS (fringe-field switching) liquid crystal display devices. In FIG. 2, only the driving electrode and common electrode for one pixel, out of a plurality of pixels, are denoted with the reference characters 103 and 104.

An alignment film 105 is formed over the electrode layer including the driving electrodes 103 and common electrodes 104. The alignment film 105 is in contact with the liquid crystal layer 111, and determines the alignment state (initial orientation) of the liquid crystal molecules when no electric field is applied.

In the configuration example of FIG. 2, the opposite substrate 200 is a CF substrate including color filters (CF). The opposite substrate 200 does not have to include color filters. The opposite substrate 200 includes an insulating substrate 141 made of a glass or resin. The insulating substrate 141 is in a rectangular shape, for example. A polarizing plate 142 is placed over the other primary surface of the insulating substrate 141, on the side opposite to the liquid crystal layer 111.

On the primary surface of the insulating substrate 141 facing the liquid crystal layer 11, a grid-shaped black matrix 124 is formed to divide respective pixels. The black matrix 124 is a metal thin film made of a black resin or chrome material, for example. A color filter 123 of red, green or blue is formed in a region of each pixel surrounding by the black matrix 124.

On the color filters 123, an insulating overcoat layer 122 is formed. The overcoat layer 122 may be omitted. On the overcoat layer 122, an alignment film 121 is formed. The alignment film 121 is in contact with the liquid crystal layer 111, and determines the alignment state (initial orientation) of the liquid crystal molecules when no electric field is applied.

The backlight unit, which is not shown in the figure, is installed on the rear surface (back side) of the liquid crystal display panel. One of the TFT substrate 100 and the opposite substrate 200 is the front side, which is where a user who views images is present, and the other one is the rear side. That is, the backlight unit is placed on the TFT substrate 101 or the opposite substrate 200 of the liquid crystal display panel illustrated in FIG. 2.

The liquid crystal layer 111 controls how much of the light from the backlight unit can transmit each pixel by adjusting the electric field applied between the driving electrode 103 and the common electrode 104. The driver IC 134 controls the potentials of the driving electrode 103 and the common electrode 104 of each pixel, respectively. The driver IC 134 controls the potential of the driving electrode 103 and the potential of the common electrode 104 of each pixel in accordance with the image data, thereby adjusting the amount of light to be transmitted in each pixel.

Below, an example of the electrode structure in the pixel circuit will be explained. The example described below is a lateral electric field type pixel circuit, and the electrode that applies electric field to the liquid crystal layer 111 is included in the TFT substrate 100. FIGS. 3A to 3F illustrate an example of the electrode structure in a pixel.

Figure 3A:
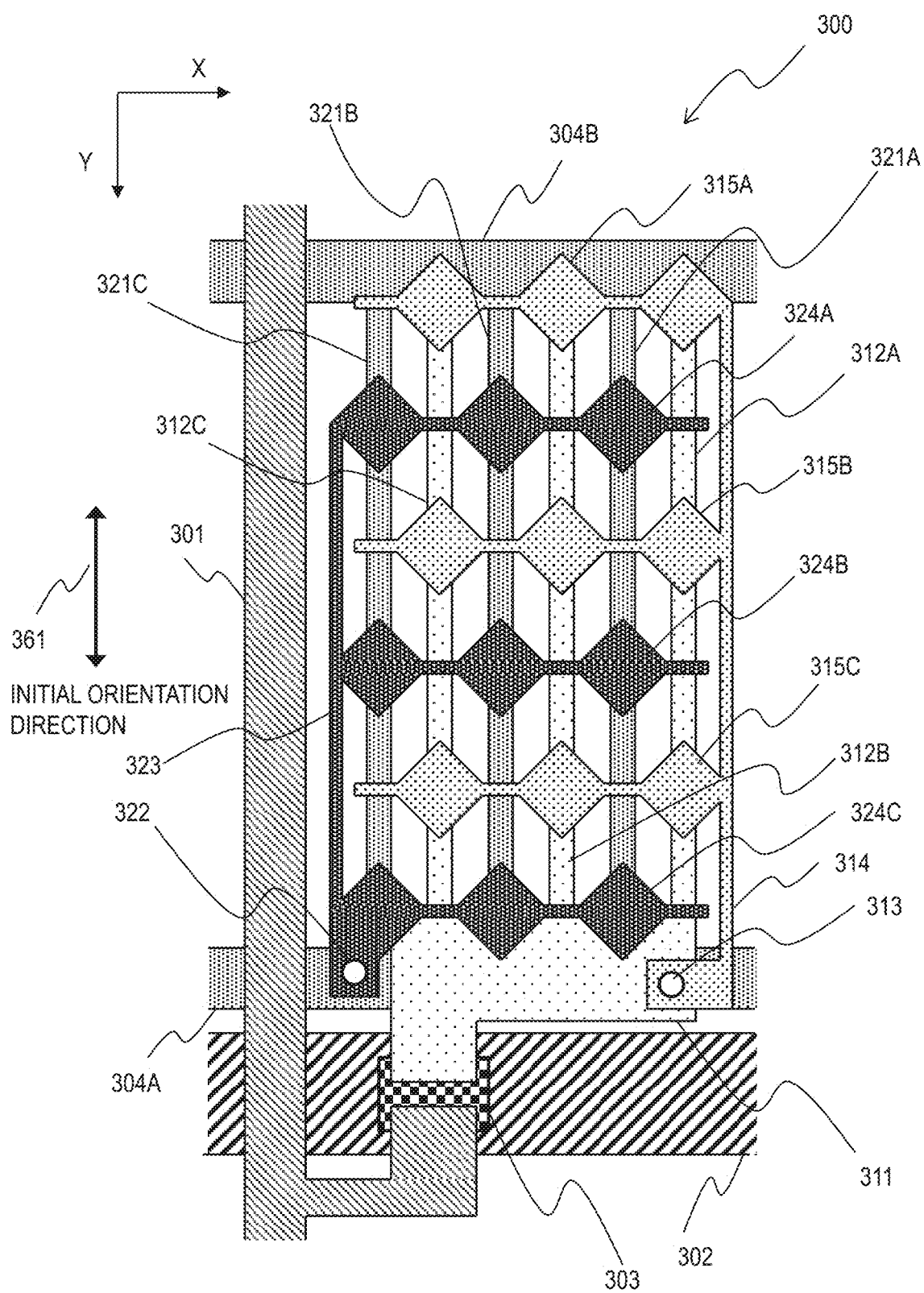
FIG. 3A is a plan view of the pixel circuit of one pixel.

FIG. 3A is a plan view of the pixel circuit of one pixel. The pixel circuit 300 includes common lines 304A and 304B (partial view) extending along the X axis and separated from each other along the Y axis, and a data line 301 (partial view) extending along the Y axis and a gate line 302 (partial view) extending along the X axis. A pixel region is defined by the common lines 304A and 304B, the data line 301, and a data line next to the data line 301 (not illustrated in the figure). In the pixel region, the amount of light transmitted changes depending on the electric field applied to the liquid crystal layer 111.

The pixel circuit 300 includes lower common electrodes 321A, 321B, and 321C. The lower common electrodes 321A, 321B, and 321C respectively extend along the Y axis, and are separated from each other along the X axis. The lower common electrodes 321A, 321B, and 321C have a linear shape, and the width thereof is the same (length along the X axis) as each other. One end of each lower common electrode 321A, 321B, and 321C is connected to the common line 304B.

The (part of) common line 304B and the lower common electrodes 321A, 321B, and 321C form a comb-shaped electrode. The lower common electrodes 321A, 321B, and 321C respectively correspond the teeth of the comb-shaped electrode.

The pixel circuit 300 includes lower driving electrodes 312A, 312B, and 312C. The lower driving electrodes 312A, 312B, and 312C respectively extend along the Y axis, and are separated from each other along the X axis. The lower driving electrodes 312A, 312B, and 312C have a linear shape, and the width thereof is the same (length along the X axis) as each other.

The lower driving electrodes 312A, 312B, and 312C, and the lower common electrodes 321A, 321B, and 321C are alternately lined up along the X axis with a space therebetween. Specifically, the lower driving electrode 312A, the lower common electrode 321A, the lower driving electrode 312B, the lower common electrode 321B, the lower driving electrode 312C, and the lower common electrode 321C are arranged in this order from right to left of FIG. 3A with a space therebetween.

One end of each lower driving electrode 312A, 312B, and 312C is connected to a lower driving electrode base part 311. The lower driving electrode base part 311 extends along the X axis. The lower driving electrode base part 311 and the lower driving electrodes 312A, 312B, and 312C form a comb-shaped electrode. The lower driving electrodes 312A, 312B, and 312C respectively correspond the teeth of the comb-shaped electrode.

The lower driving electrode base part 311 is connected to one source/drain electrode of a TFT, and at least part of the source/drain electrode overlaps a channel portion 303 of the TFT in a plan view. The channel portion 303 overlaps the gate line 302 in a plan view. The other source/drain electrode of the TFT is connected to the data line 301.

The pixel circuit 300 includes upper common electrodes 324A, 324B, and 324C. The upper common electrodes 324A, 324B, and 324C respectively extend along the X axis, and are separated from each other along the Y axis. One end of each upper common electrode 324A, 324B, and 324C is connected to an upper common electrode base part 323 that extends along the Y axis. The upper common electrode base part 323 is physically and electrically connected to the common line 304A by a contact portion (interlayer connector) 322.

The pixel circuit 300 includes upper driving electrodes 315A, 315B, and 315C. The upper driving electrodes 315A, 315B, and 315C respectively extend along the X axis, and are separated from each other along the Y axis. One end of each upper driving electrode 315A, 315B, and 315C is connected to an upper driving electrode base part 314 that extends along the Y axis. The upper driving electrode base part 314 is physically and electrically connected to the lower driving electrode base part 311 by a contact portion (interlayer connector) 313.

The upper driving electrodes 315A, 315B, and 315C, and the upper common electrodes 324A, 324B, and 324C are alternately lined up along the Y axis with the space therebetween. Specifically, the upper driving electrode 315A, the upper common electrode 324A, the upper driving electrode 315B, the upper common electrode 324B, the upper driving electrode 315C, and the upper common electrode 324C are arranged in this order from top to bottom of FIG. 3A with the space therebetween. The initial orientation direction 361 is the direction parallel to the orientation axis of the liquid crystal layer 111 defined by the alignment films 105 and 121, or the Y axis.

Figure 3B:
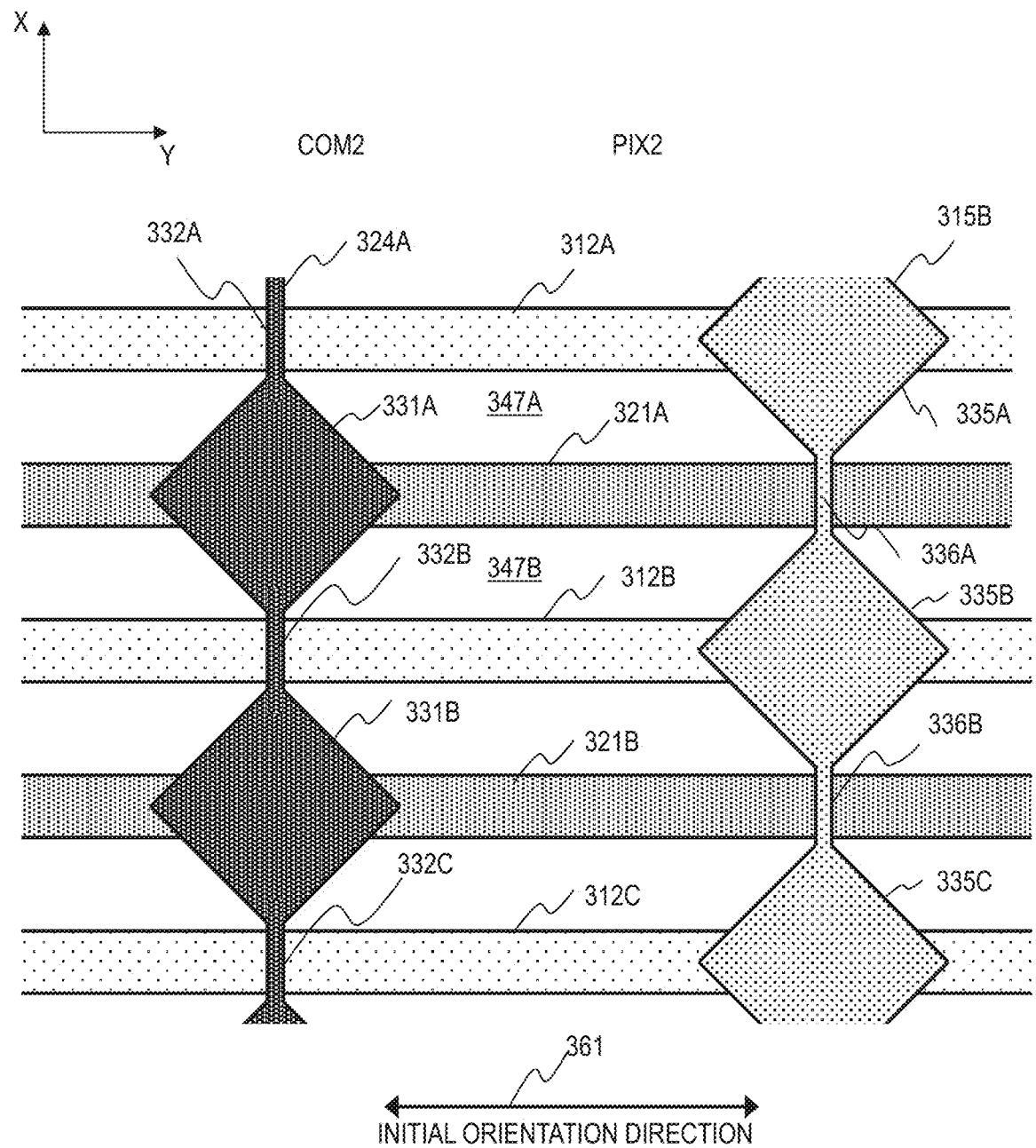
FIG. 3B is a diagram for explaining the structure of the lower common electrodes, lower driving electrodes, upper common electrodes, and upper driving electrodes in detail.

FIG. 3B is a diagram for explaining the structure of the lower common electrodes, lower driving electrodes, upper common electrodes, and upper driving electrodes in detail. FIG. 3B illustrates the lower common electrodes 321A and 321B, the lower driving electrodes 312A, 312B, and 312C, the upper common electrode 324A, and the upper driving electrode 315B as an example.

The upper common electrode 324A includes diamond portions 331A and 331B and linear portions 332A, 332B, and 332C. The diamond portions 331A and 331B and the linear portions 332A, 332B, and 332C are arranged alternately along the X axis.

In each of the diamond portions 331A and 331B, two corners face each other along the X axis, and the other two corners face each other along the Y axis. In a plan view, one diamond portion intersects with one lower common electrode. The diamond portion (or part thereof) overlaps one lower common electrode (or part thereof) in a plan view. In the example of FIG. 3B, the diamond portion 331A overlaps the lower common electrode 321A and the diamond portion 331B overlaps the lower common electrode 321B.

The linear portion is connected to one or two diamond portions. The maximum width of the diamond portion is at least twice the width of the linear portion. In FIG. 3B, the linear portions 332B and 332C each connect two diamond portions. The linear portion 332A connects to one diamond portion 331A only. The minimum width of the linear portion is preferably 2 to 3 µm, The linear portions 332A, 332B, and 332C extend in the direction along the X axis, and the width thereof (length along the Y axis) is the same as each other. Thus, in each of the linear portions 332A, 332B, and 332C, two sides facing each other extend along the X axis. In a plan view, one linear portion intersects with one lower driving electrode. The linear portion (or part thereof) overlaps one lower driving electrode in a plan view. In the example of FIG. 3B, the linear portion 332A overlaps the lower driving electrode 312A, the linear portion 332B overlaps the lower driving electrode 312B, and the linear portion 332C overlaps the lower driving electrode 312C.

The upper driving electrode 315B includes diamond portions 335A, 335B and 335C, and linear portions 336A and 336B. The diamond portions 335A, 335B, and 335C and the linear portions 336A and 336B are arranged alternately along the X axis.

In each of the diamond portions 335A, 335B, and 335C, two corners face each other along the X axis, and the other two corners face each other along the Y axis. In a plan view, one diamond portion intersects with one lower driving electrode. The diamond portion (or part thereof) overlaps one lower driving electrode (or part thereof) in a plan view. In the example of FIG. 3B, the diamond portion 335A overlaps the lower driving electrode 312A and the diamond portion 335B overlaps the lower driving electrode 312B.

The linear portion is connected to one or two diamond portions. The maximum width of the diamond portion is at least twice the width of the linear portion. In FIG. 3B, the linear portions 336A and 336B each connect two diamond portions. The width of the linear portion is preferably 2 to 3 µm. The linear portions 336A and 336B extend in the direction along the X axis, and the width thereof (length along the Y axis) is the same as each other. Thus, in each of the linear portions 336A and 336B, two sides facing each other extend along the X axis.

In a plan view, one linear portion intersects with one lower common electrode. The linear portion (or part thereof) overlaps one lower common electrode in a plan view. In the example of FIG. 3B, the linear portion 336A overlaps the lower common electrode 321A and the linear portion 336B overlaps the lower common electrode 321B.

The pixel region is divided into a plurality of sub-sections by the lower common electrode, the lower driving electrode, the upper common electrode, and the upper driving electrode. In the example of FIG. 3B, two sub-sections are denoted with the reference characters 347A and 347B. Each sub-section is defined by the lower common electrode, the lower driving electrode, the upper common electrode, and the upper driving electrode.

For example, the sub-section 347A is defined by the lower common electrode 321A, the lower driving electrode 312A, the upper common electrode 324A, and the upper driving electrode 315B. The sub-section 347B is defined by the lower common electrode 321A, the lower driving electrode 312B, the upper common electrode 324A, and the upper driving electrode 315B.

Each sub-section includes two opposing sides extending along the Y axis (orientation axis), and two opposing sides extending in a slanted manner with respect to the Y axis and the X axis that is perpendicular to the Y axis. For example, in the sub-section 347A, the two opposing sides extending along the Y axis are one side of the lower driving electrode 312A and one side of the lower common electrode 321A that face each other. Also, in the sub-section 347A, the two opposing sides extending in a slanted manner with respect to the X axis and Y axis are one side of the diamond portion 331A of the upper common electrode 324A and one side of the diamond portion 335A of the upper driving electrode 315B.

In the sub-section 347B, the two opposing sides extending along the Y axis are one side of the lower driving electrode 312B and one side of the lower common electrode 321A that face each other. The two opposing sides extending in a slanted manner with respect to the X axis and Y axis in the sub-section 347B are one side of the diamond portion 331A of the upper common electrode 324A and one side of the diamond portion 335B of the upper driving electrode 315B.

Figure 3C:
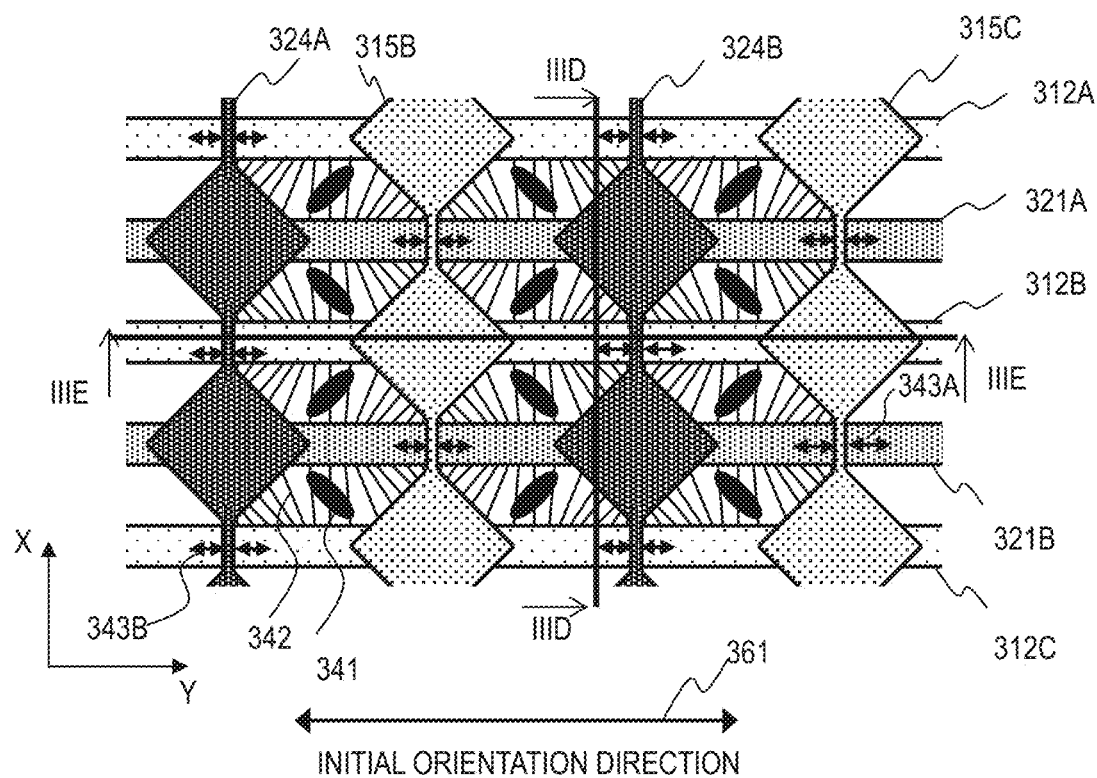
FIG. 3C schematically illustrates a part of the electrode structure of the pixel circuit and electric field formed in the pixel region.
Figure 3D:
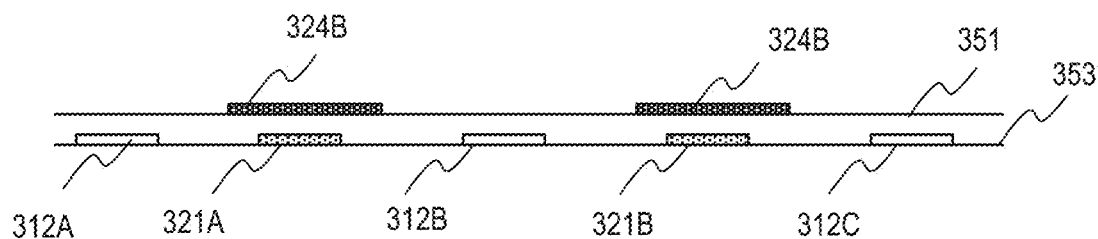
FIG. 3D is a cross-sectional view taken along the line IIID-IIID of FIG. 3C.
Figure 3E:
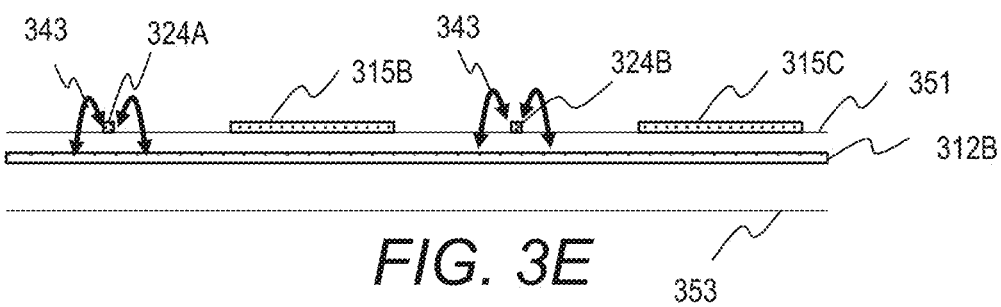
FIG. 3E is a cross-sectional view taken along the line IIIE-IIIE of FIG. 3C.

FIG. 3C schematically illustrates a part of the electrode structure of the pixel circuit and electric field formed in the pixel region. FIG. 3D is a cross-sectional view taken along the line IIID-IIID of FIG. 3C, and FIG. 3E is a cross-sectional view taken along the line IIIE-IIIE of FIG. 3C. The line IIID-IIID is along the X axis, and the line IIIE-IIIE is along the Y axis.

As illustrated in FIGS. 3D and 3E, the lower driving electrodes 312A, 312B, and 312C and the lower common electrode 321A and 321B are arranged in the same layer, and formed on the insulating layer 353. The insulating layer 351 covers the lower driving electrodes 312A, 312B, and 312C and the lower common electrode 321A and 321B. The upper common electrodes 324A and 324B and the upper driving electrodes 315B and 315C are arranged in the same layer, and formed on the insulating layer 351. This explanation applies to all of the upper driving electrodes, upper common electrodes, lower driving electrodes, and lower common electrodes.

Returning to FIG. 3A, the data line 301 is located at a layer above the upper common electrodes and the upper driving electrodes. The channel portion 303 is located at a layer below the lower driving electrodes and the lower common electrodes. The gate line 302 and the common line 304A are located at the same layer that is below the channel portion 303.

The electrodes and wiring lines are made of a metal. The driving electrodes and common electrodes may be formed of a transparent conductive material such as ITO or IZO, for example. The driving electrodes, the common electrodes, the gate lines, the data lines, and the common line may have a single-layer structure made of a single metal selected from chrome, molybdenum, aluminum, and titanium, or an alloy thereof. Those elements may alternatively have a multi-layer structure in which each layer is made of a single metal or an alloy. An insulating layer is provided between respective different metal layers, and is formed of silicon nitride or silicon oxide, for example. The elements of the pixel circuit are made of appropriate conductive materials or insulating materials selected for the design.

As illustrated in FIG. 3C, electric field (part of which is denoted with the reference character 342) to rotate the liquid crystal molecules 341 is generated in the sub-section defined by the lower driving electrode, the lower common electrode, the upper driving electrode, and the upper common electrode. As described above, the upper driving electrode and the upper common electrode include diamond portions, and each diamond portion includes a side that is slanted with respect to the X axis and Y axis.

The sides that define the sub-section include a side of the lower common electrode and a side of the lower driving electrode extending along the Y axis, and one side of a diamond portion of the upper common electrode and one side of a diamond portion of the upper driving electrode. By the side of the lower common electrode extending along the Y axis and the side of the upper driving electrode slanted with respect to the X axis and Y axis, a wide oblique electric field inclined with respect to the X axis and Y axis is generated. Also, by the side of the lower driving electrode extending along the Y axis and the side of the upper common electrode slanted with respect to the X axis and Y axis, a wide oblique electric field inclined with respect to the X axis and Y axis is generated. The oblique electric field can improve the response speed when the pixel voltage is applied (reduce the response time). In one example, the angle formed by the side of the diamond portion with the X axis or Y axis is 45 degrees.

On the other hand, the intersection of the lower common electrode and the linear portion of the upper driving electrode generates an electric field (part of which is denoted with the reference character 343A) along the Y axis (orientation axis). Similarly, the intersection of the lower driving electrode and the linear portion of the upper common electrode generates an electric field (part of which is denoted with the reference character 343B) along the Y axis (orientation axis). With those electric fields along the orientation axis, the orientation of the liquid crystal molecules 341 is affixed to the initial orientation direction 361.

Figure 3F:
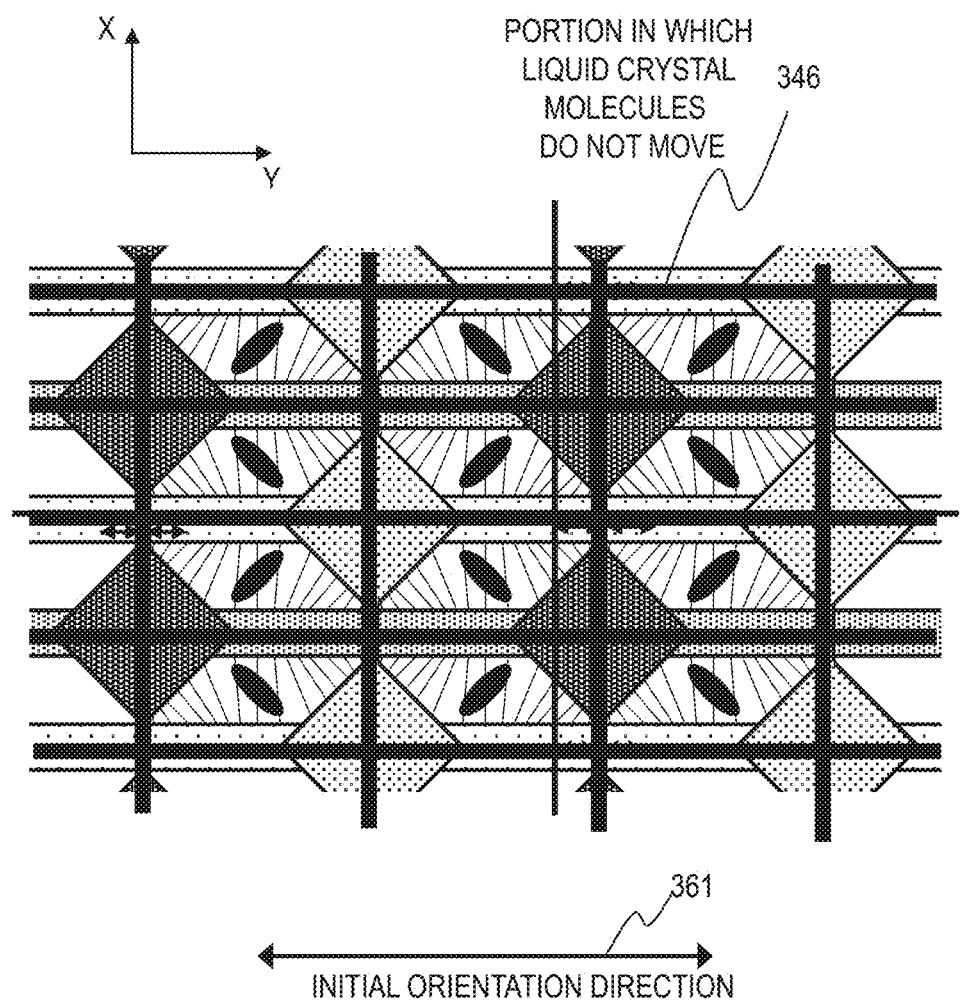
FIG. 3F schematically illustrates a portion in which the liquid crystal molecules do not move even when the pixel voltage is applied.

FIG. 3F schematically illustrates a portion 346 in which the liquid crystal molecules 341 do not move even when the pixel voltage is applied. The portion 346 has a grid-like shape. The portion 346 is constituted of sections that each overlap the center of the lower driving electrode or lower common electrode, extend along the Y axis, and are lined up along the X axis at a certain interval, and sections that each overlap the center of the upper driving electrode or upper common electrode, extend along the X axis, and are lined up along the Y axis at a certain interval. A rectangular region defined by the portion 346 each includes a sub-section of the pixel region (such as 347A and 347B).

As described above, by having the grid-shaped portion 346 where the liquid crystal molecules do not rotate, the operation of the liquid crystal molecules can be stable whether the pixel voltage is applied or not.

Unlike the example described above, the lower driving electrode may include the diamond portions and linear portions while the upper driving electrodes are in a linear shape, and the lower common electrode may include the diamond portions and linear portions while the upper common electrodes are in a linear shape. Both of the upper driving electrode and lower driving electrode may be in a linear shape, or in other words, both of the upper driving electrodes and the lower driving electrodes may be formed in a stripe pattern. Both of the upper common electrode and lower common electrode may be in a linear shape, or in other words, both of the upper common electrodes and the lower common electrodes may be formed in a stripe pattern. Those apply to other embodiments as well.

Embodiment 2

Figure 4:
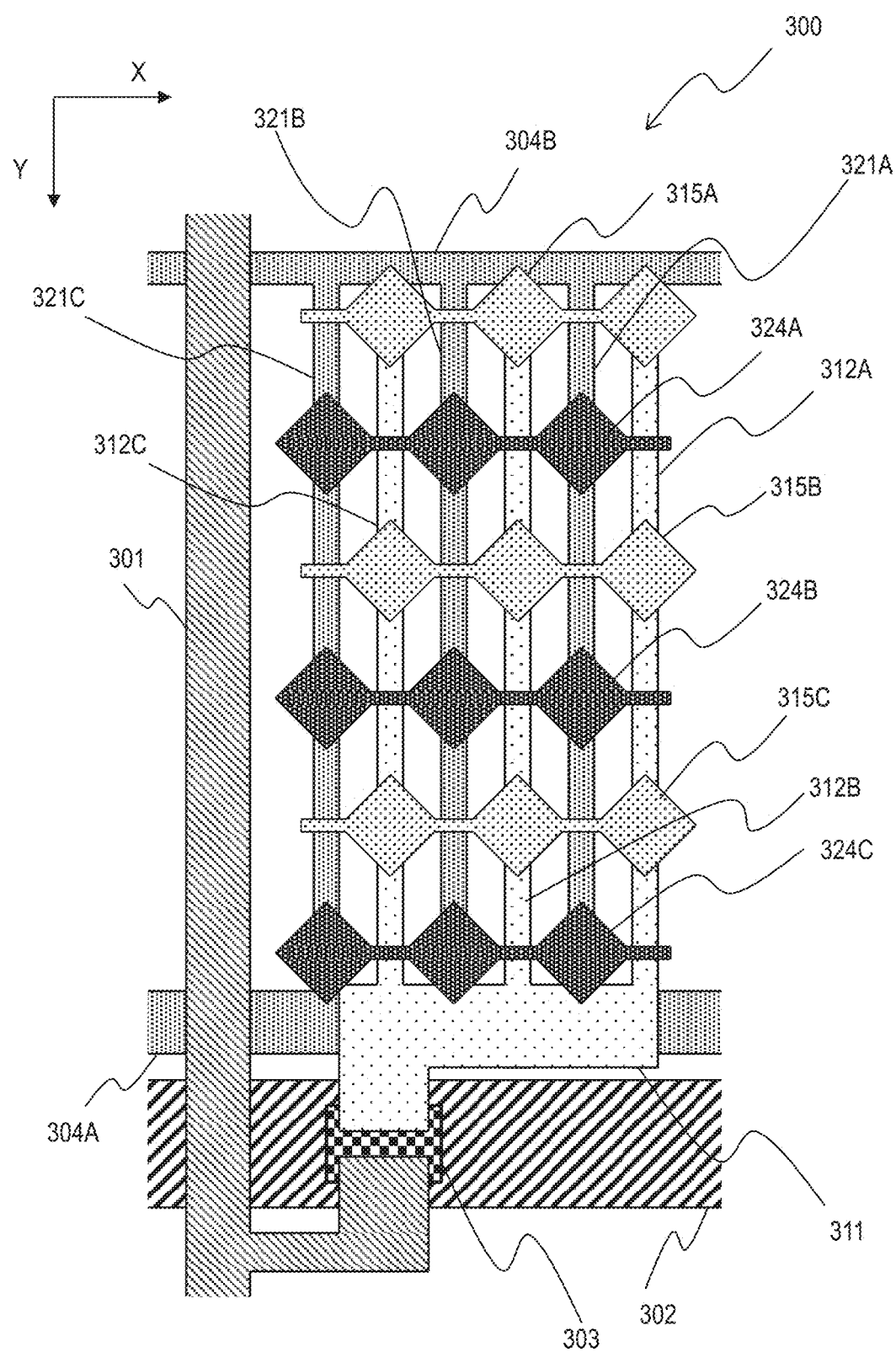
FIG. 4 is a plan view schematically illustrating the electrode structure of Embodiment 2.

FIG. 4 is a plan view schematically illustrating the electrode structure of Embodiment 2. Below, the differences from Embodiment 1 will mainly be discussed. As illustrated in FIG. 4, the base part 314 of the driving electrode and the base part 323 of the common electrode, which were described in Embodiment 1, are omitted. The upper driving electrodes 315A, 315B, and 315C are separated from any conductive members, and surrounded by insulating members, thereby being in an electrically floating state (floating electrode). Similarly, the upper common electrodes 324A, 324B, and 324C are separated from any conductive members, and surrounded by insulating members, thereby being in an electrically floating state (floating electrode).

The area in which the upper driving electrodes 315A, 315B, and 315C overlap the lower common electrodes 321A, 321B, and 321C is smaller than the area in which the upper driving electrodes 315A, 315B, and 315C overlap the lower driving electrodes 312A, 312B, and 312C. The upper driving electrodes 315A, 315B, and 315C are coupled with the lower driving electrodes 312A, 312B, and 312C, and receive the driving potential (pixel potential) through the lower driving electrodes 312A, 312B, and 312C.

The area in which the upper common electrodes 324A, 324B, and 324C overlap the lower driving electrodes 312A, 312B, and 312C is smaller than the area in which the upper common electrodes 324A, 324B, and 324C overlap the lower common electrodes 321A, 321B, and 321C. The upper common electrodes 324A, 324B, and 324C are coupled with the lower common electrodes 321A, 321B, and 321C, and receive the common potential through the lower common electrodes 321A, 321B, and 321C.

In this embodiment, the upper driving electrodes are capacitively coupled with the lower driving electrodes, and the upper common electrodes are capacitively coupled with the lower common electrodes, and therefore, it is not necessary to connect the upper driving electrodes to the lower driving electrodes via conductive members, or to connect the upper common electrodes to the lower common electrodes via conductive members. Only one of the lower driving electrodes and upper common electrodes may be given the driving potential or common potential through capacitance coupling.

Embodiment 3

Figure 5A:
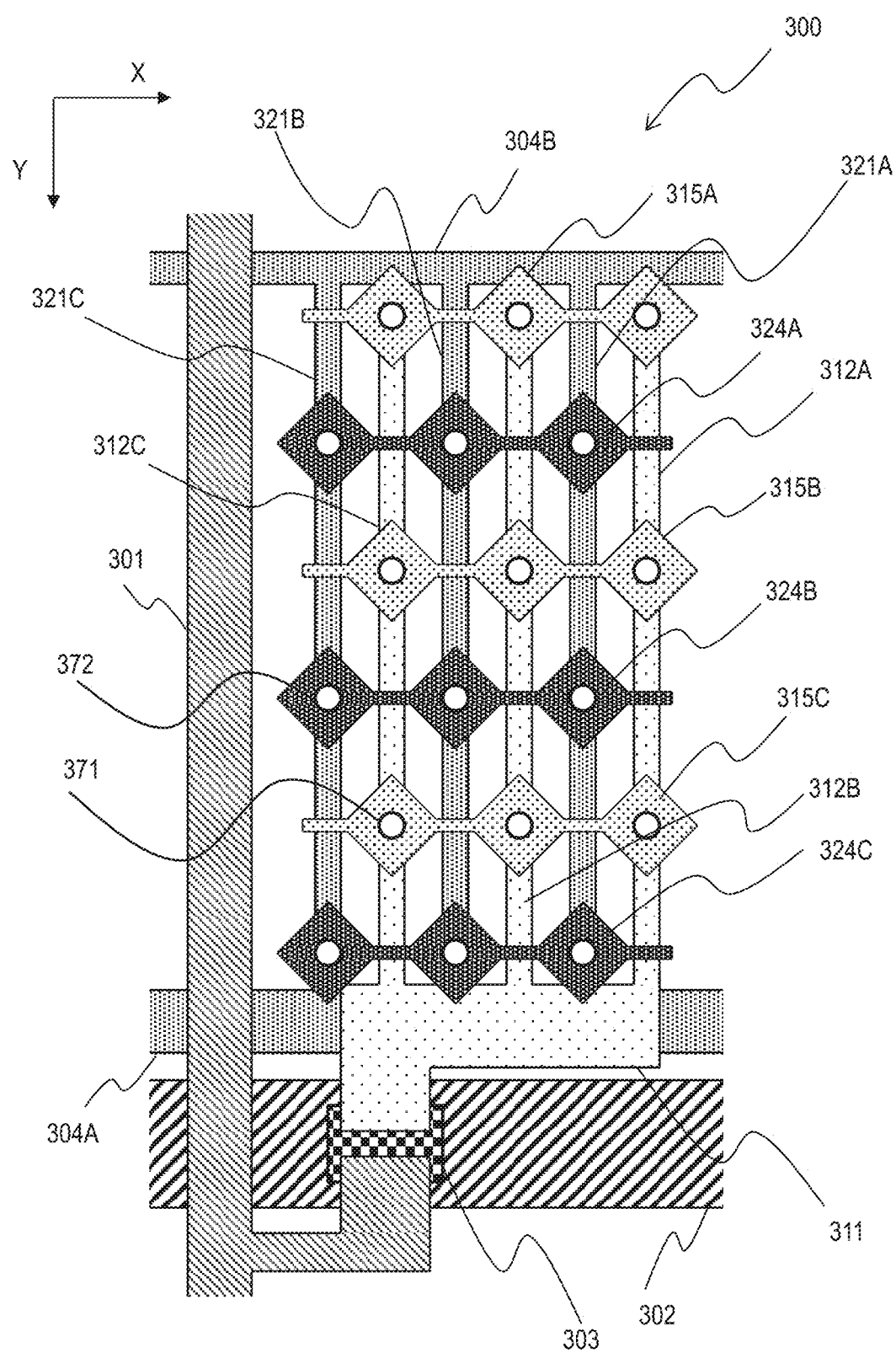
FIG. 5A is a plan view schematically illustrating the electrode structure of Embodiment 3.
Figure 5B:
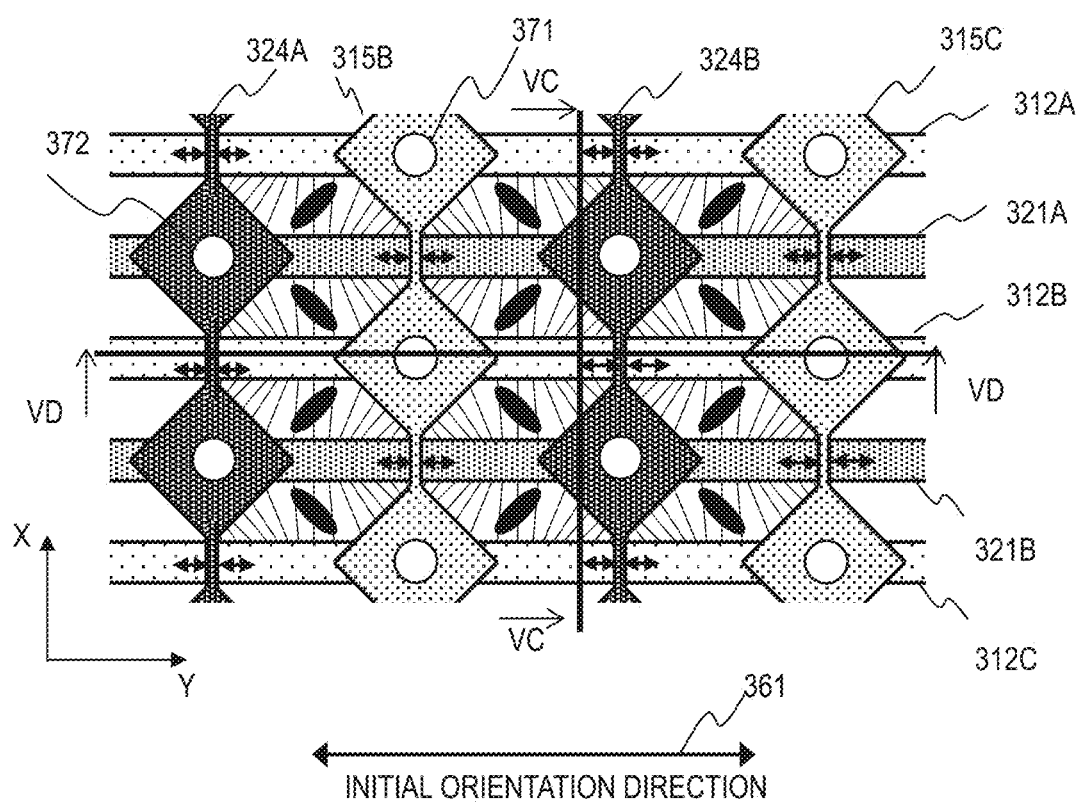
FIG. 5B is a diagram for explaining the structure of the lower common electrodes, lower driving electrodes, upper common electrodes, and upper driving electrodes in detail.
Figure 5C:
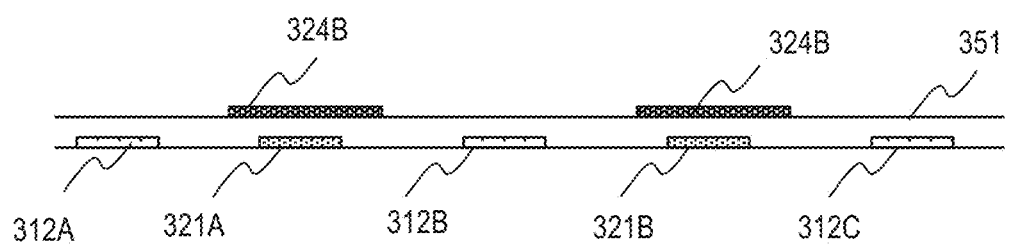
FIG. 5C is a cross-sectional view taken along the line VC-VC of FIG. 5B.
Figure 5D:
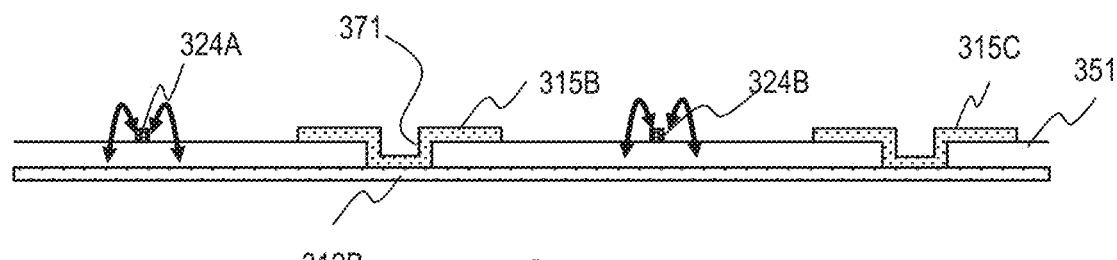
FIG. 5D is a cross-sectional view taken along the line VD-VD of FIG. 5B.

FIG. 5A is a plan view schematically illustrating the electrode structure of Embodiment 3. FIG. 5B is a diagram for explaining the structure of the lower common electrodes, lower driving electrodes, upper common electrodes, and upper driving electrodes in detail. FIGS. 5C and 5D are respectively a cross-sectional view taken along the line VC-VC of FIG. 5B, and a cross-sectional view taken along the line VD-VD. Below, the differences from Embodiment 1 will mainly be discussed.

The base part 314 of the driving electrode and the base part 323 of the common electrode, which were described in Embodiment 1, are omitted. The upper driving electrodes 315A, 315B, and 315C are physically and electrically connected to the lower driving electrodes 312A, 312B, and 312C by contact portions (interlayer connector) 371 formed at each intersection of those electrodes in the pixel region. In FIGS. 5A to 5D, one contact portion is denoted with the reference character 371, for example.

The upper common electrodes 324A, 324B, and 324C are physically and electrically connected to the lower common electrodes 321A, 321B, and 321C by contact portions (interlayer connector) 372 formed at each intersection of those electrodes in the pixel region. In FIGS. 5A to 5D, one contact portion is denoted with the reference character 372, for example.

With the configuration of this embodiment, the upper driving electrodes can receive the driving potential and the upper common electrodes can receive the common potential. The respective upper driving electrodes need to be connected to at least one lower driving electrode via the contact portion 371, and the respective upper common electrodes need to be connected to at least one lower common electrode via the contact portion 372. Only one of the driving electrodes and the common electrodes may be maintained at the same potential via the contact portion at the intersection, and the other may be capacitively coupled, for example.

Embodiment 4

Figure 6A:
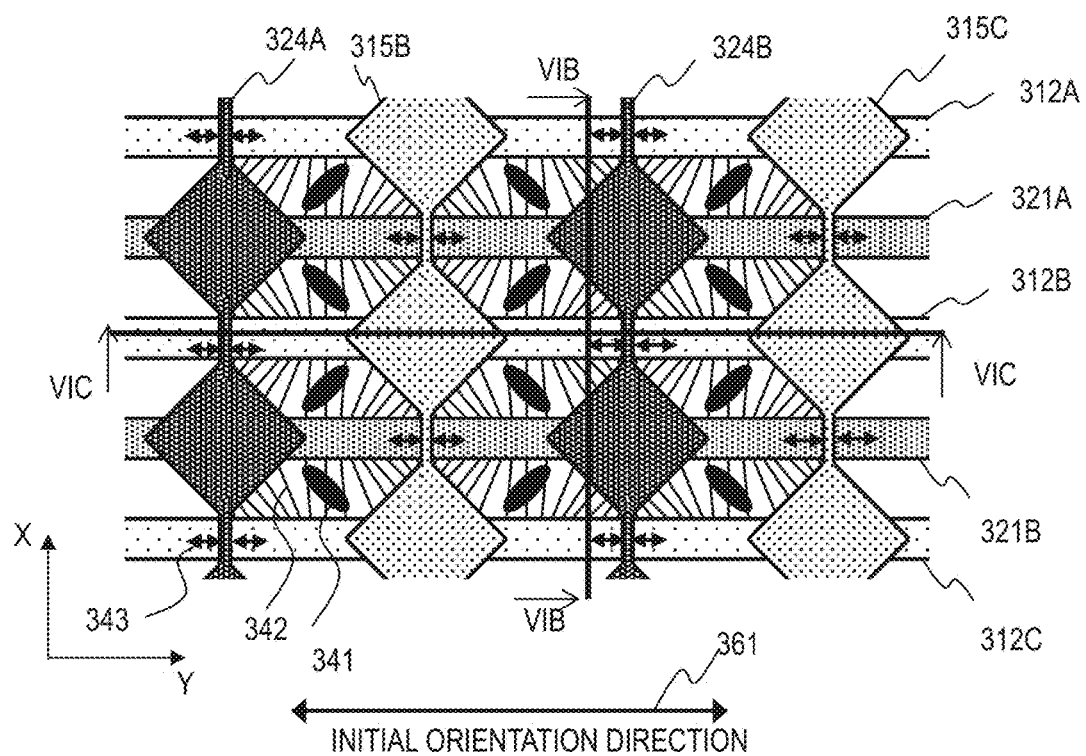
FIG. 6A is a plan view schematically illustrating the electrode structure of Embodiment 4.
Figure 6B:
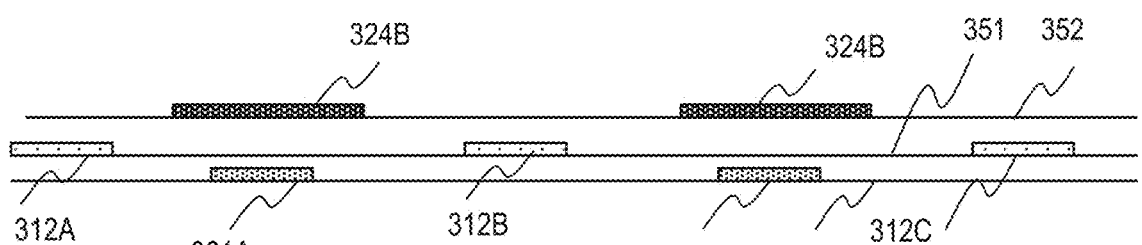
FIG. 6B is a cross-sectional view taken along the line VIB-VIB of FIG. 6A.
Figure 6C:
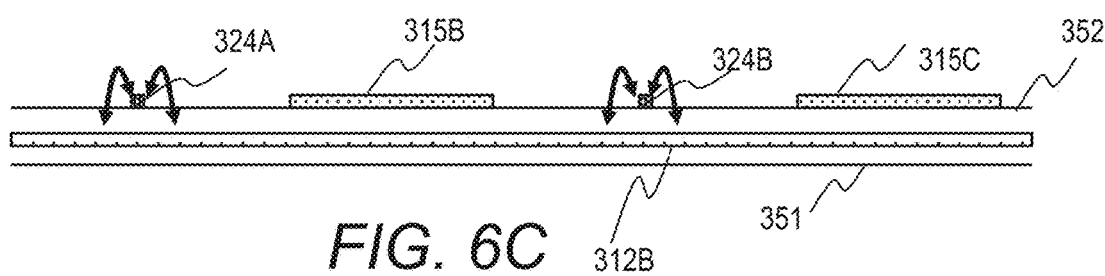
FIG. 6C is a cross-sectional view taken along the line VIC-VIC of FIG. 6A.

FIG. 6A is a plan view schematically illustrating the electrode structure of Embodiment 4. FIG. 6B is a cross-sectional view taken along the line VIB-VIB of FIG. 6A. FIG. 6C is a cross-sectional view taken along the line VIC-VIC of FIG. 6A. Below, the differences from Embodiment 1 and Embodiment 2 will mainly be discussed.

The lower common electrodes 321A, 321B, and 321C are located at a layer differing from the lower driving electrodes 312A, 312B, and 312C. Specifically, the lower driving electrodes 312A, 312B, and 312C are located at a layer above the lower common electrodes 321A, 321B, and 321C. An insulating layer 351 is formed between the lower driving electrodes 312A, 312B, and 312C and the lower common electrodes 321A, 321B, and 321C. The lower driving electrodes 312A, 312B, and 312C are formed on the insulating layer 351.

An insulating layer 352 is arranged between the lower driving electrodes 312A, 312B, and 312C, and the upper driving electrodes 315A, 315B, and 315C and upper common electrodes 324A, 324B, and 324C. The insulating layer 352 covers lower driving electrodes 312A, 312B, and 312C. The upper driving electrodes 315A, 315B, and 315C and upper common electrodes 324A, 324B, and 324C are formed on the insulating layer 352.

With the configuration of this embodiment, even if the pitch of the lower driving electrodes 312A, 312B, and 312C and the lower common electrodes 321A, 321B, and 321C is made narrower, short-circuit between the respective electrodes can reliably be prevented.

Embodiment 5

Figure 7A:
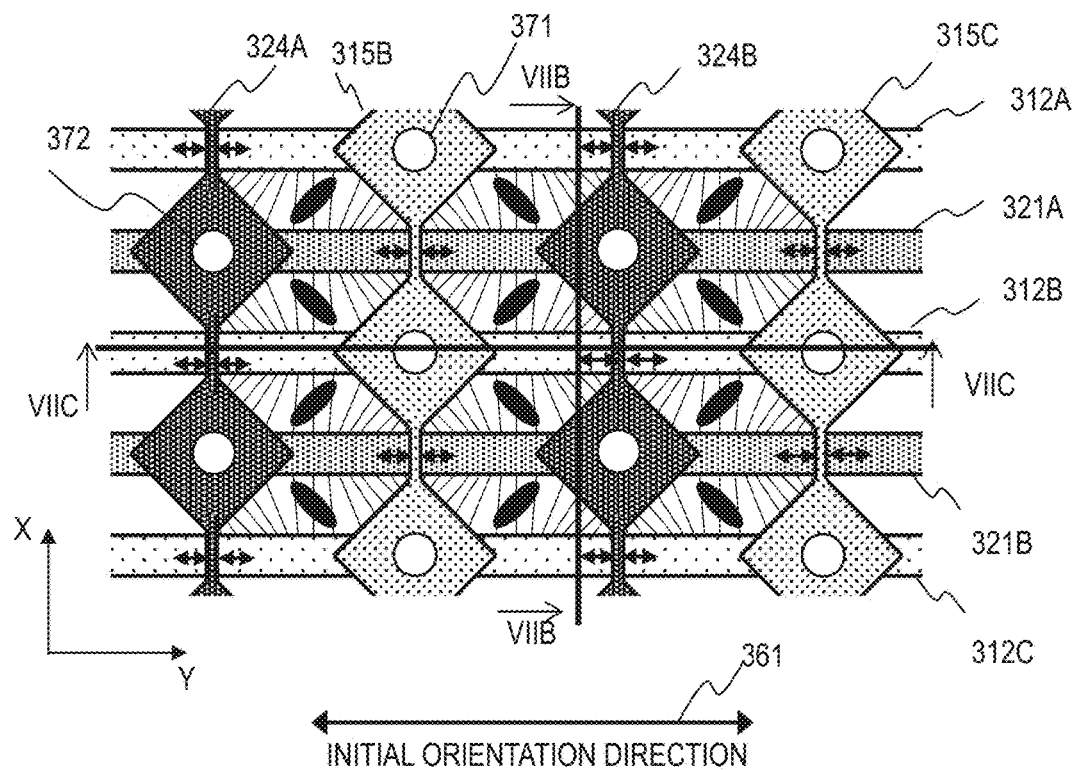
FIG. 7A is a plan view schematically illustrating the electrode structure of Embodiment 5.
Figure 7B:
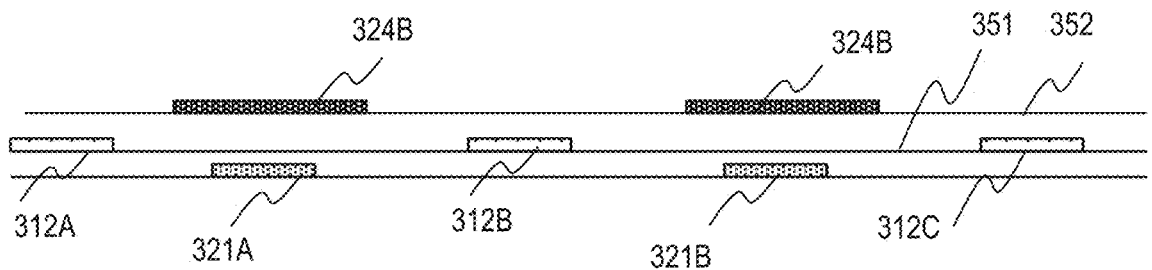
FIG. 7B is a cross-sectional view taken along the line VIIB-VIIB of FIG. 7A.
Figure 7C:
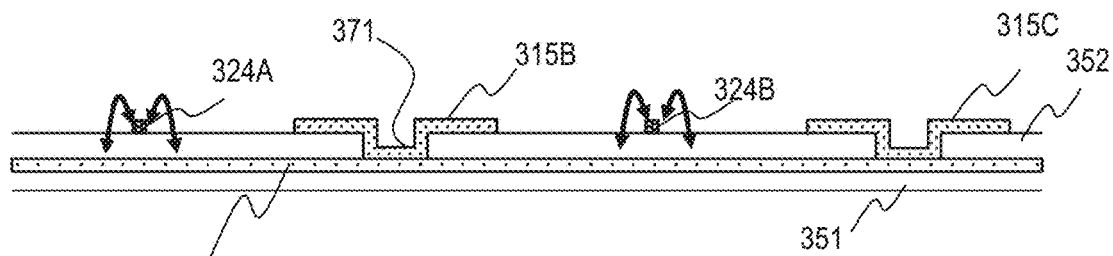
FIG. 7C is a cross-sectional view taken along the line VIIC-VIIC of FIG. 7A.

FIG. 7A is a plan view schematically illustrating the electrode structure of Embodiment 5. FIG. 7B is a cross-sectional view taken along the line VIIB-VIIB of FIG. 7A. FIG. 7C is a cross-sectional view taken along the line VIIC-VIIC of FIG. 7A. Below, the differences from Embodiment 3 will mainly be discussed.

The lower common electrodes 321A, 321B, and 321C are located at a layer differing from the lower driving electrodes 312A, 312B, and 312C. Specifically, the lower driving electrodes 312A, 312B, and 312C are located at a layer above the lower common electrodes 321A, 321B, and 321C. An insulating layer 351 is formed between the lower driving electrodes 312A, 312B, and 312C and the lower common electrodes 321A, 321B, and 321C. The lower driving electrodes 312A, 312B, and 312C are formed on the insulating layer 351.

An insulating layer 352 is arranged between the lower driving electrodes 312A, 312B, and 312C, and the upper driving electrodes 315A, 315B, and 315C and upper common electrodes 324A, 324B, and 324C. The insulating layer 352 covers lower driving electrodes 312A, 312B, and 312C. The upper driving electrodes 315A, 315B, and 315C and upper common electrodes 324A, 324B, and 324C are formed on the insulating layer 352.

With the configuration of this embodiment, even if the pitch of the lower driving electrodes 312A, 312B, and 312C and the lower common electrodes 321A, 321B, and 321C is made narrower, short-circuit between the respective electrodes can reliably be prevented.

Embodiment 6

Figure 8A:
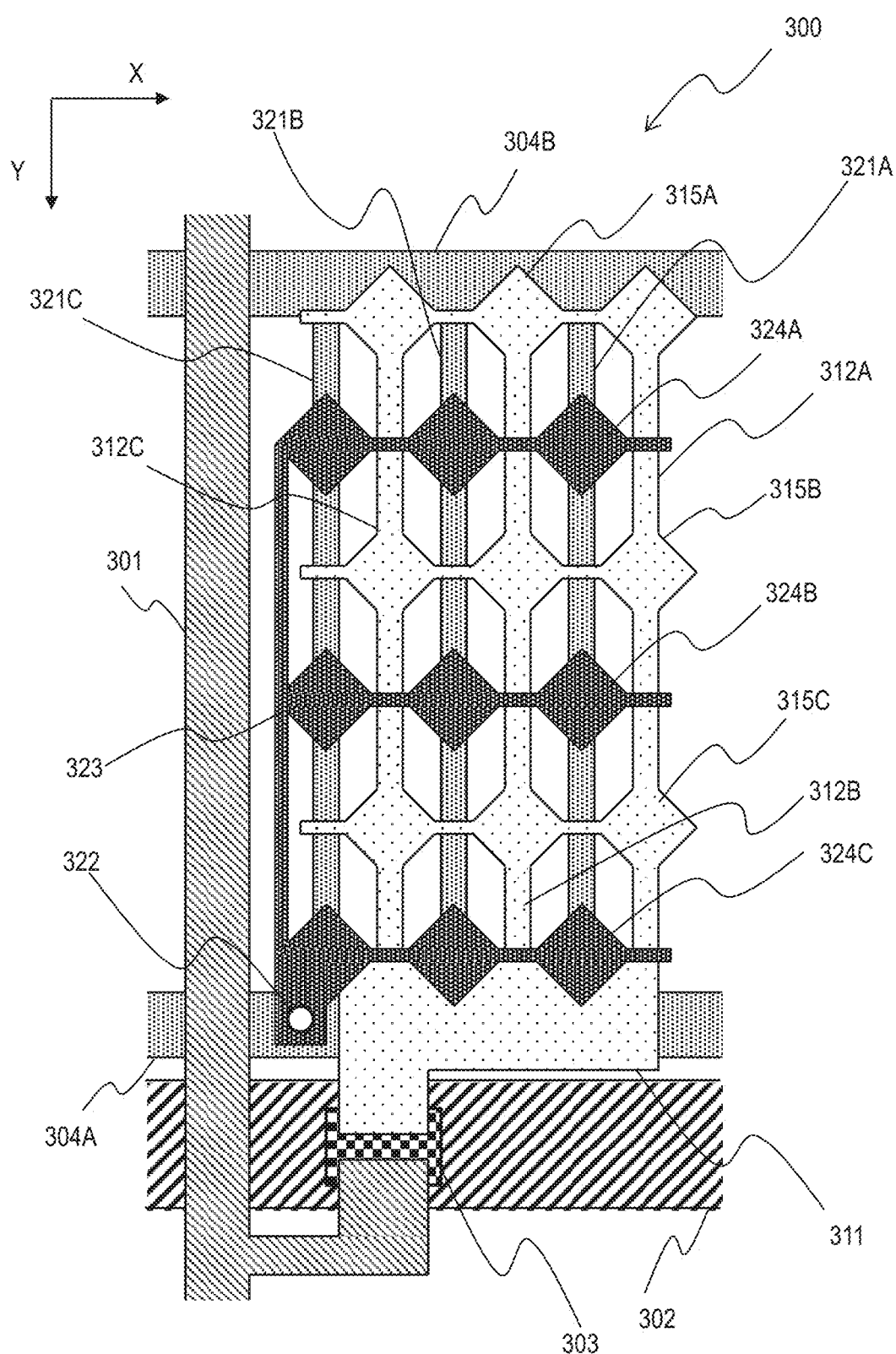
FIG. 8A is a plan view schematically illustrating the electrode structure of Embodiment 6.
Figure 8B:
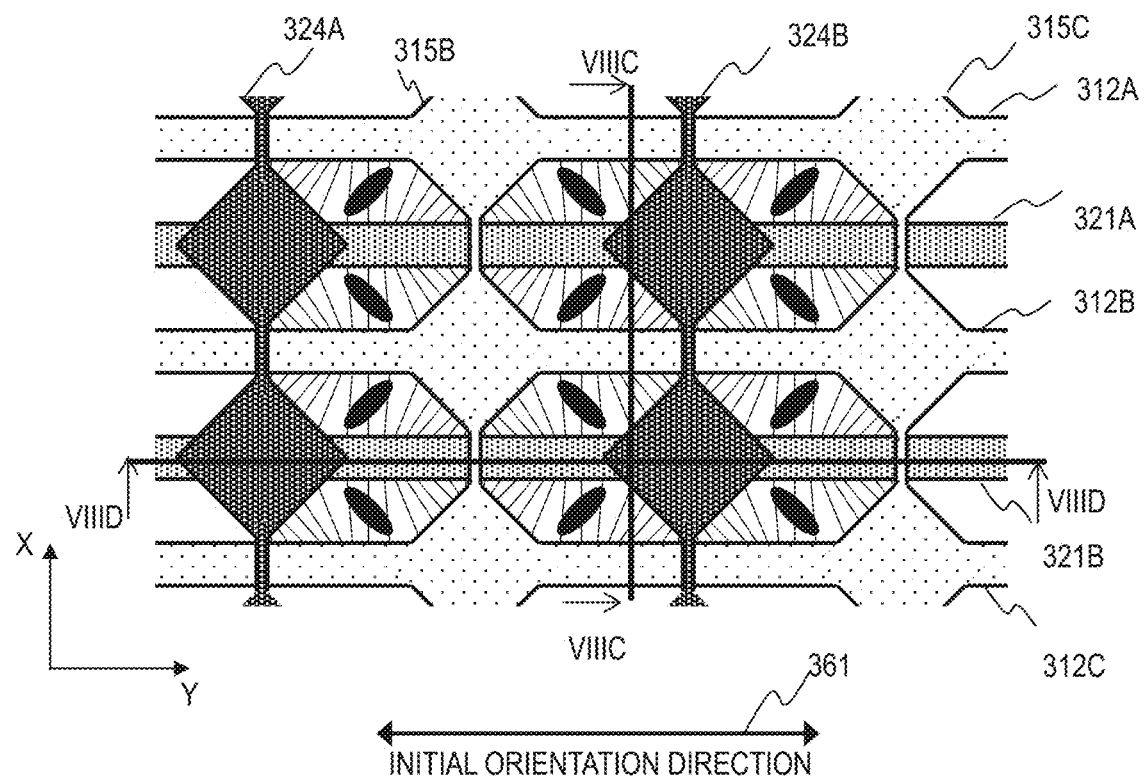
FIG. 8B is a diagram for explaining the structure of the lower common electrodes, lower driving electrodes, upper common electrodes, and upper driving electrodes in detail.
Figure 8C:
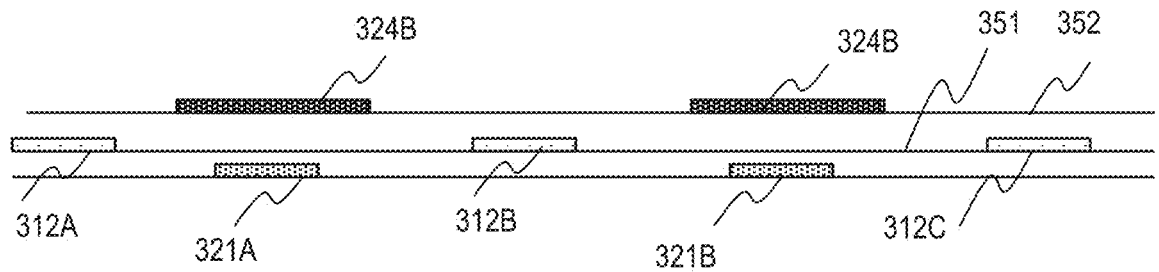
FIG. 8C is a cross-sectional view taken along the line VIIIC-VIIIC of FIG. 8B.
Figure 8D:
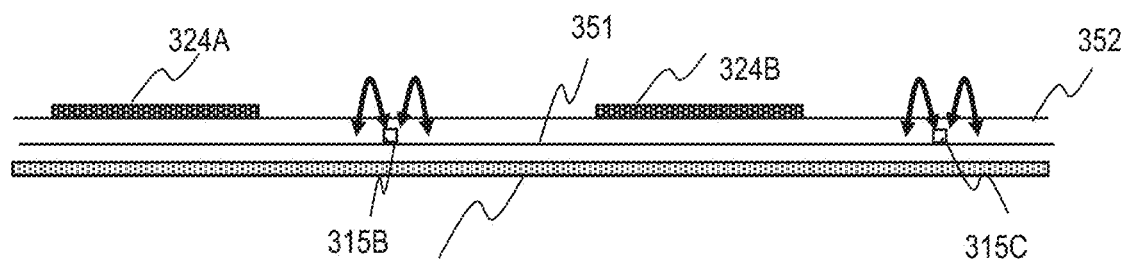
FIG. 8D is a cross-sectional view taken along the line VIIID-VIIID of FIG. 8B.

FIG. 8A is a plan view schematically illustrating the electrode structure of Embodiment 6. FIG. 8B is a diagram for explaining the structure of the lower common electrodes, lower driving electrodes, upper common electrodes, and upper driving electrodes in detail. FIG. 8C is a cross-sectional view taken along the line VIIIC-VIIIC of FIG. 8B. FIG. 8D is a cross-sectional view taken along the line VIIID-VIIID of FIG. 8B. Below, the differences from Embodiment 1 will mainly be discussed.

The driving electrodes 312A, 312B, and 312C and the driving electrodes 315A, 315B, and 315C, which were formed at two different layers in Embodiment 1, are formed at the same layer. The driving electrodes 312A, 312B, and 312C are continuous to the driving electrodes 312A, 315B, and 315C at the respective intersections. The base part 314 and the contact portion 313 of the driving electrodes are omitted. The driving electrodes 312A, 312B, and 312C and the driving electrodes 315A, 315B, and 315C can be formed at the same time by patterning one metal film, for example.

As illustrated in FIGS. 8C and 8D, the driving electrodes 312A, 312B, 312C, 315A, 315B, and 315C are arranged between the lower common electrodes 321A, 321B and 321C and the upper common electrodes 324A, 324B, and 324C. The insulating layer 351 is arranged between the driving electrodes 312A, 312B, 312C, 315A, 315B, and 315C and the lower common electrodes 321A, 321B, and 321C. The insulating layer 352 is arranged between the driving electrodes 312A, 312B, 312C, 315A, 315B, and 315C and the upper common electrodes 324A, 324B, and 324C.

Each linear portion of the driving electrodes 315A, 315B, and 315C extending along the X-axis intersects with one of the lower common electrodes 321A, 321B, and 321C through the insulating layer 351. Each linear portion of the upper common electrodes 324A, 324B, and 324C extending along the X-axis intersects with one of the driving electrodes 312A, 312B, and 312C through the insulating layer 352.

With the electrode structure of this embodiment, the manufacturing efficiency can be improved while ensuring that the same electrical field as Embodiment 1 is formed. The driving electrodes may be replaced with the common electrodes. Specifically, all common electrodes are located at the same layer, and the respective common electrodes extending along the X axis are continuous to the common electrodes extending along the Y axis at the respective intersection. The common electrodes are sandwiched by the upper driving electrodes and the lower driving electrodes through the insulating layers, respectively.

Embodiment 7

Figure 9:
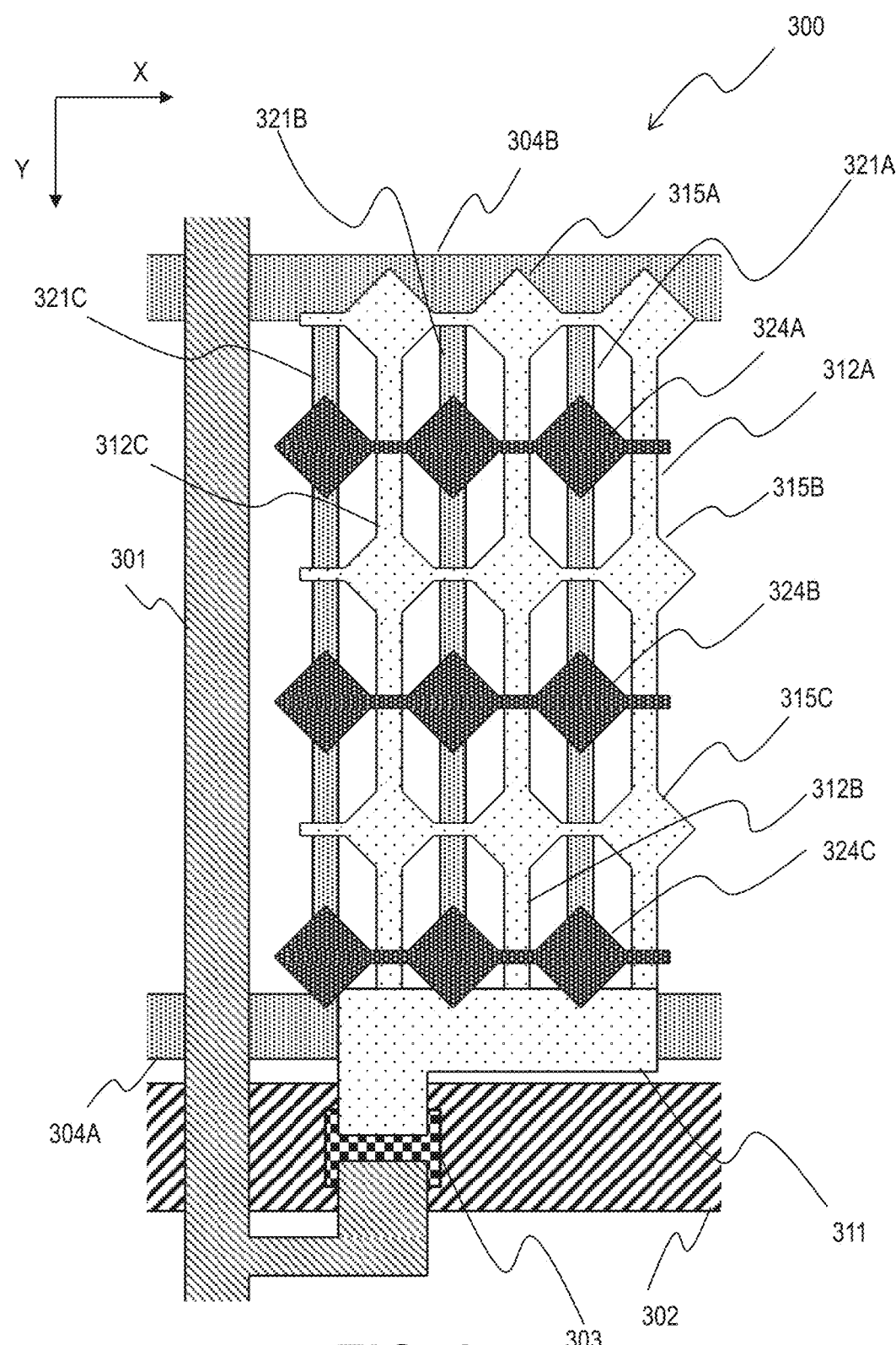
FIG. 9 is a plan view schematically illustrating the electrode structure of Embodiment 7.

FIG. 9 is a plan view schematically illustrating the electrode structure of Embodiment 7. Below, the differences from Embodiment 6 will mainly be discussed. The base part 323 of the upper common electrode is omitted. Similar to Embodiment 2, the upper common electrodes 324A, 324B, and 324C are separated from any conductive members, and surrounded by insulating members, thereby being in an electrically floating state (floating electrode).

The area in which the upper common electrodes 324A, 324B, and 324C overlap the lower driving electrodes 312A, 312B, and 312C is smaller than the area in which the upper common electrodes 324A, 324B, and 324C overlap the lower common electrodes 321A, 321B, and 321C. The upper common electrodes 324A, 324B, and 324C are coupled with the lower common electrodes 321A, 321B, and 321C, and receive the common potential through the lower common electrodes 321A, 321B, and 321C.

Embodiment 8

Figure 10A:
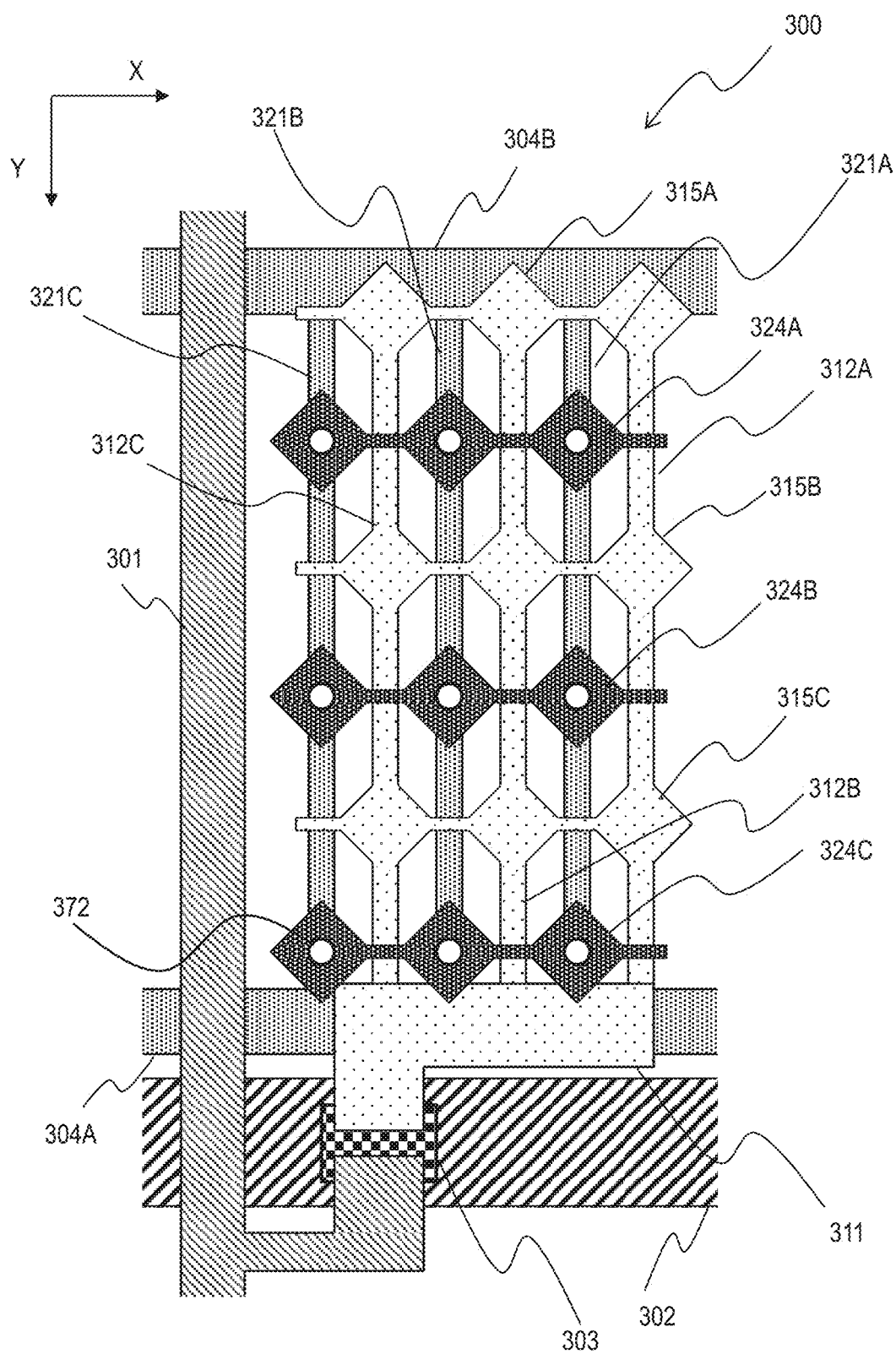
FIG. 10A is a plan view schematically illustrating the electrode structure of Embodiment 8.
Figure 10B:
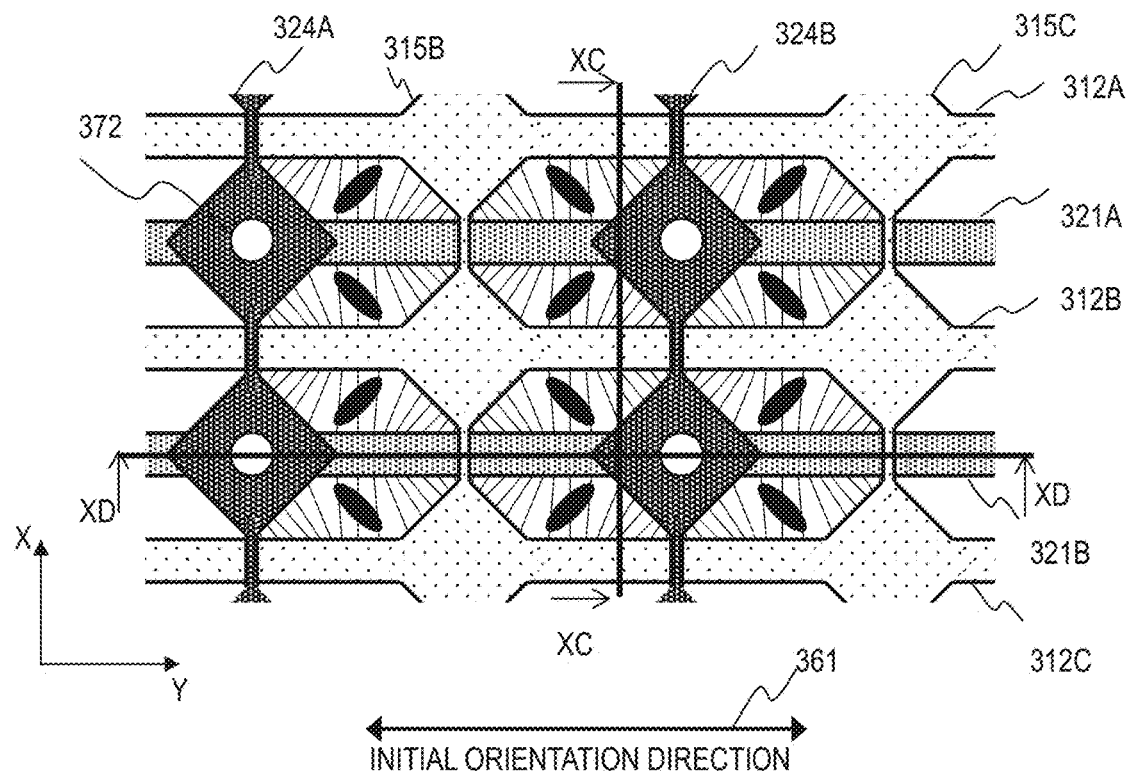
FIG. 10B is a diagram for explaining the structure of the lower common electrodes, lower driving electrodes, upper common electrodes, and upper driving electrodes in detail.
Figure 10C:
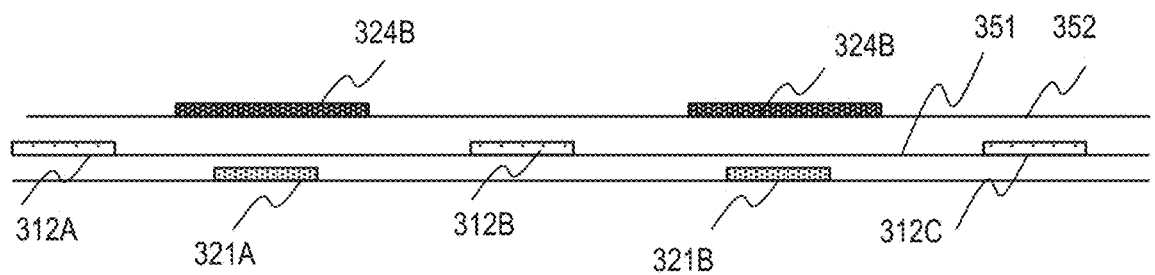
FIGS. 10C and 10D are respectively a cross-sectional view taken along the line XC-XC of FIG. 10B, and a cross-sectional view taken along the line XD-XD.
Figure 10D:
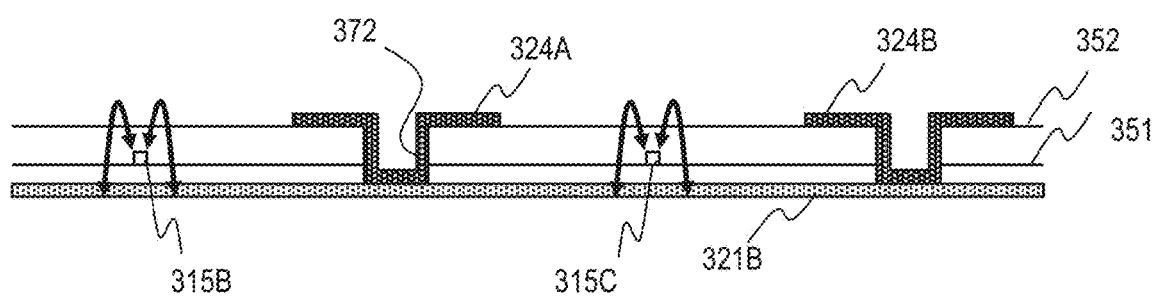

FIG. 10A is a plan view schematically illustrating the electrode structure of Embodiment 8. FIG. 10B is a diagram for explaining the structure of the lower common electrodes, lower driving electrodes, upper common electrodes, and upper driving electrodes in detail. FIGS. 10C and 10D are respectively a cross-sectional view taken along the line XC-XC of FIG. 10B, and a cross-sectional view taken along the line XD-XD.

Below, the differences from Embodiment 6 will mainly be discussed. The base part 323 of the upper common electrode is omitted. As in Embodiment 3, the upper common electrodes 324A, 324B, and 324C are physically and electrically connected to the lower common electrodes 321A, 321B, and 321C by contact portions 372 formed at the respective intersection of those electrodes in the pixel region.

Embodiment 9

Figure 11:
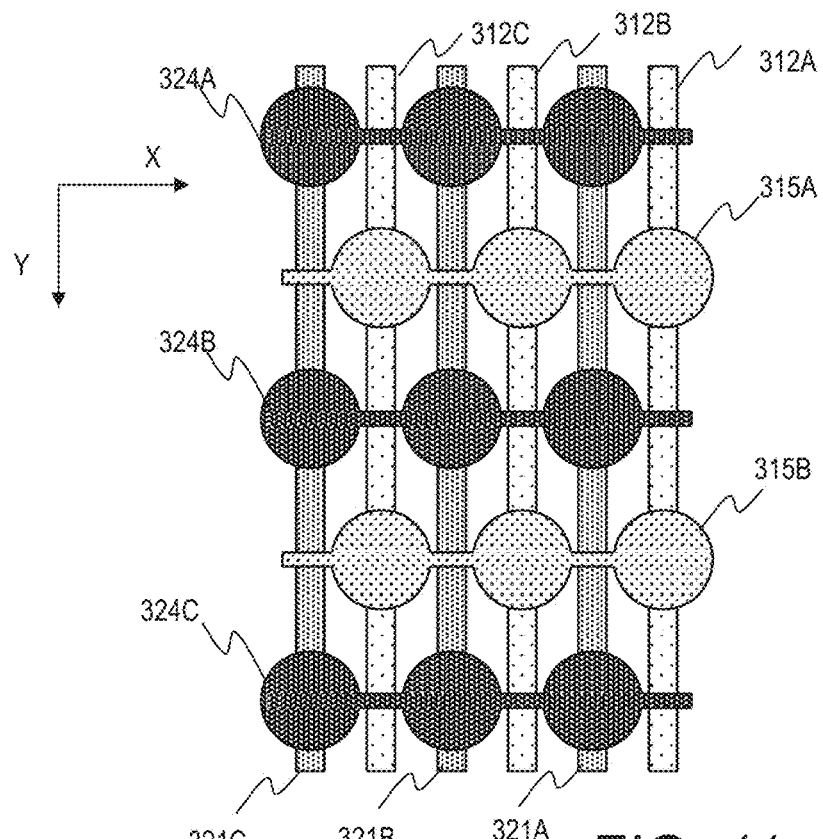
FIGS. 11, 12, and 13 illustrate in-pixel electrode structures in which respective electrodes are in different shapes.
Figure 12:
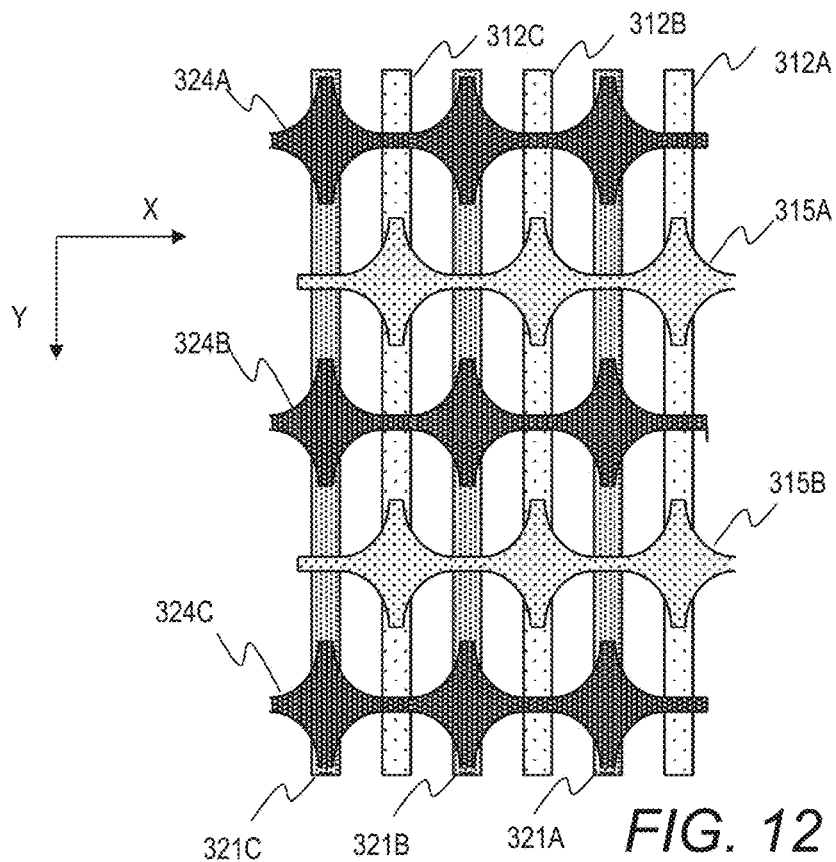
Figure 13:
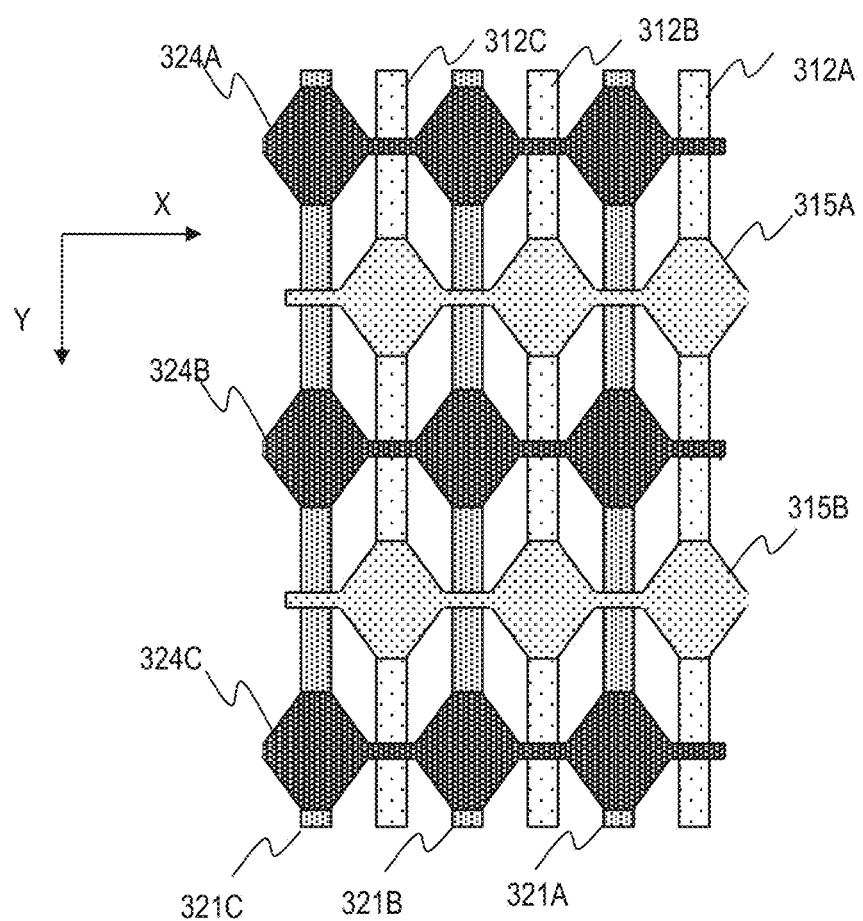

FIGS. 11, 12, and 13 illustrate in-pixel electrode structures in which respective electrodes are in different shapes. Below, the differences from Embodiment 1 will mainly be discussed. The example of FIG. 11 includes the lower driving electrodes 312A, 312B, and 312C, the lower common electrodes 321A, 321B, and 321C, the upper driving electrodes 315A and 315B, and the upper common electrodes 324A, 324B, and 324C.

The upper driving electrodes 315A and 315B and the upper common electrodes 324A, 324B, and 324C have circular portions instead of the diamond portions of Embodiment 1. The arc of part of the circular portion is part of the sides that define the sub-section of the pixel region, and is regarded as a side slanted with respect to the X axis and Y axis.

In the example of FIG. 12, the upper driving electrodes 315A and 315B and the upper common electrodes 324A, 324B, and 324C have portions each including curved lines (recessed toward the center) instead of the diamond portions of Embodiment 1. This curved line is part of the sides that define the sub-section of the pixel region, and is regarded as a side slanted with respect to the X axis and Y axis.

In the example of FIG. 13, the upper driving electrodes 315A and 315B and the upper common electrodes 324A, 324B, and 324C have polygonal portions instead of the diamond portions of Embodiment 1. A part of the polygonal portion intersecting with the lower common electrode or the lower driving electrode includes two opposing sides extending along the X axis. The polygonal portions each have a shape that is obtained by removing the corners from the diamond portion that overlap the lower driving electrode or the lower common electrode. The polygonal portion has a side that is part of the sides defining the sub-section of the pixel region, and that is slanted with respect to the X axis and Y axis.

Embodiment 10 to Embodiment 14

As the number of divided sections applied with electric field separately in an opening of each pixel (opening region) increases, or as the number of the openings in each pixel increases, it takes shorter for the liquid crystal molecules to return to the initial orientation direction when the driving potential applied to the driving electrodes is turned off. Thus, the response speed would improve even with the same liquid crystal material. In Embodiments 10 to 14 below, the driving electrodes and the common electrodes in the FFS type liquid crystal display device having the shape that can improve the response speed of the liquid crystal molecules will be explained.

In Embodiments 10 to 14, the electrode structure of one pixel in the liquid crystal display panel will be explained as an example. The liquid crystal display panel includes a plurality of electrode sets that apply electric field to each of the pixel region of liquid crystal, and each of the plurality of electrode sets includes at least a driving electrode and a common electrode. In the descriptions below, the driving potential is given to the driving electrodes, and the common potential is given to the common electrodes. The common electrodes are arranged to overlap the driving electrodes.

Embodiment 10

Figure 14A:
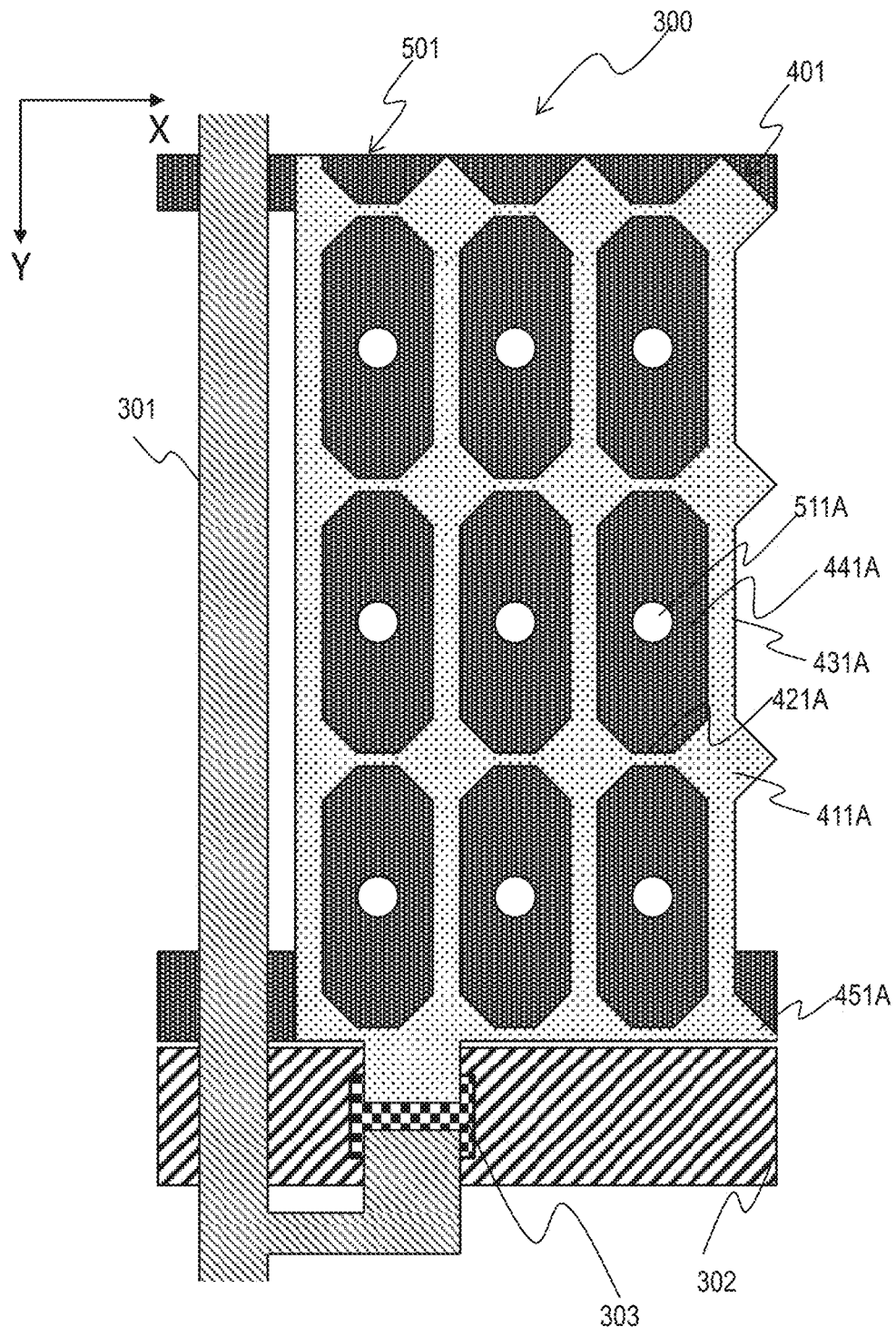
FIG. 14A is a plan view schematically illustrating the electrode structure of Embodiment 10.

FIG. 14A is a plan view schematically illustrating the electrode structure of Embodiment 10. Below, the differences from Embodiment 1 will mainly be discussed. The pixel 300 includes the upper driving electrode 401 and the common electrode 501.

The upper driving electrode 401 is in a grid-like shape. The upper driving electrode 401 has a plurality of intersections, a plurality of row connectors, a plurality of column connectors, and a plurality of openings. In FIG. 14A, the intersection is denoted with the reference character 411A, for example. The intersections are arranged in a matrix at a certain interval. That is, the intersections are arranged along the X axis and Y axis to be separated from each other. The intersections may be of various shapes such as a diamond shape, pentagon, or hexagon. If the intersection is in a diamond shape, the intersection will also be referred to as a diamond portion. If the intersection is in a diamond shape, the intersection has sides that are slanted with respect to the X axis and Y axis. The row direction is a direction along the X axis, for example, and the column direction is a direction along the Y axis, for example.

In FIG. 14A, the row connector is denoted with the reference character 421A, for example. The row connector connects two intersections to each other that are arranged along the row direction at a certain interval. The row connector is also referred to as an X-axis linear portion. In FIG. 14A, the column connector is denoted with the reference character 431A, for example. The column connector connects two intersections to each other that are arranged along the column direction at a certain interval. The column connector is also referred to as a Y-axis linear portion.

In FIG. 14A, the opening is denoted with the reference character 441A, for example. Each of the openings is defined by four intersections, two row connectors, and two column connectors.

The common electrode 501 is an electrode that forms to cover the pixel 300, which is a unit pixel. That is, the common electrode 501 is formed in the pixel 300 continuously. The common electrode 501 has a plurality of holes. In FIG. 14A, the hole is denoted with the reference character 511A, for example. The holes are formed in the row direction and the column direction at an even interval. The holes are formed to divide the opening into four sections as described with reference to FIG. 14B.

The base part 451A is connected to one source/drain electrode of a TFT, and at least part of the source/drain electrode overlaps the channel portion 303 of the TFT in a plan view. The channel portion 303 overlaps the gate line 302 in a plan view.

Figure 14B:
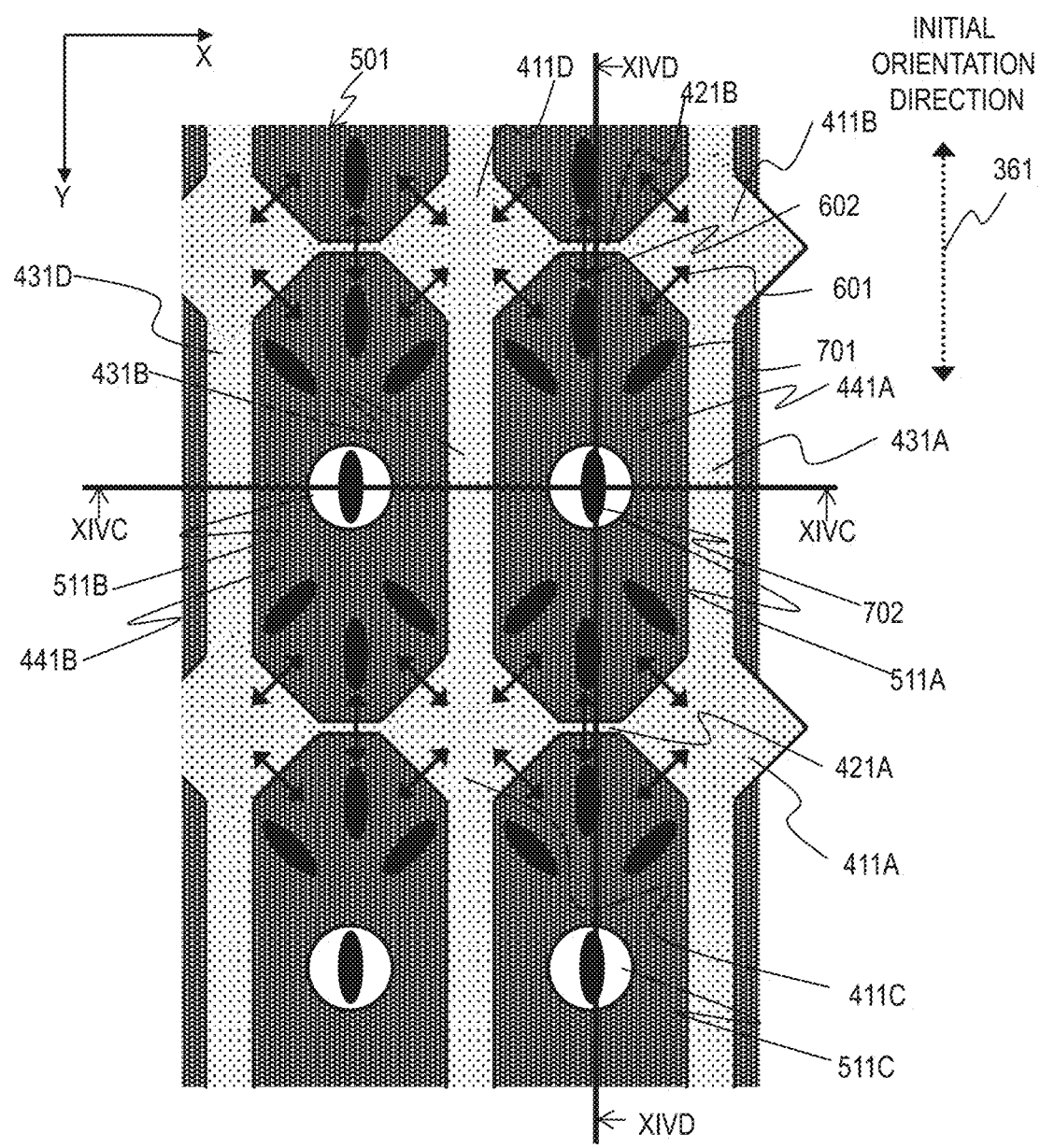
FIG. 14B is a diagram explaining the structure of the upper driving electrode and the common electrode in detail.

Next, with reference to FIG. 14B, the shape of the openings and the operation of the liquid crystal molecules will be explained. FIG. 14B is a diagram explaining the structure of the upper driving electrode 401 and the common electrode 501 in detail. FIG. 14B illustrates the structure near the opening 441A of FIG. 14. Below, the differences from Embodiment 1 will mainly be discussed.

The upper driving electrode 401 has a plurality of openings. Each of the openings is defined by the first to fourth intersections, the first and second row connectors, and the first and second column connectors. For example, the opening 441A is defined by the first intersection 411A to the fourth intersection 411D, the first and second row connectors 421A and 421B, and the first and second column connectors 431A and 431B.

The first and second intersections 411A and 411B are next to each other in the column direction, keeping the certain distance therebetween. The third and fourth intersections 411C and 411D are next to each other in the column direction, keeping the certain distance therebetween. The third and fourth intersections 411C and 411D are next to the first and second intersections 411A and 411B, respectively, in the row direction, keeping the certain distance therebetween.

The first column connector 431A connects the first and second intersections 411A and 411B to each other. The second column connector 431B connects the third and fourth intersections 411C and 411D to each other. The first row connector 421A connects the first and third intersections 411A and 411C to each other. The second row connector 421B connects the second and fourth intersections 411B and 411D to each other.

The plurality of column connectors are arranged along the X axis direction at an even interval. For example, the column connectors 431A, 431B, and 431D are arranged along the X axis direction at an even interval. The plurality of row connectors are arranged along the Y axis direction at an even interval. For example, the column connectors 421A and 421B are arranged along the Y axis direction at an even interval.

Next, the common electrode 501 will be explained. The common electrode 501 has holes that respectively overlap the plurality of openings. For example, the common electrode 501 has a hole 511A corresponding in position to the opening 441A, and a hole 511B corresponding in position to the opening 441B. The hole may be in various shapes such as a polygon, in addition to a circle.

For example, the holes 511A and 511B are next to each other in the row direction, keeping a certain distance therebetween. The holes 511A and 511C are next to each other in the column direction, keeping the certain distance therebetween. The portion of the pixel defined by the opening is also referred to as a sub-section.

Next, the operation of the electric field and liquid crystal molecules will be explained. In each of the sub-sections, an electric field to rotate the liquid crystal molecules is generated. In the figure, the electric field is indicated with the solid double arrows, and part of the electric field is denoted with the reference character 601, for example. The side of the diamond portion of the upper driving electrode 401 and the common electrode 501 form a wide oblique electric field inclined with respect to the X axis and Y axis (such as the oblique electric field 601). This oblique electric field 601 makes the liquid crystal molecules 701 around the oblique electric field 601 oriented obliquely. The row connector and the common electrode 501 form an electric field (electric field 602, for example) along the Y axis (orientation axis). With this electric field along the orientation axis, the orientation of the surrounding liquid crystal molecules is affixed to the initial orientation direction.

The liquid crystal molecules 702 located above the hole 511A in the opening 441A are not affected by the electric field, and keep the initial orientation direction. This affixed liquid crystal molecules 702 function as a wall, and thus, the opening 441A is divided into four sections separately affected by different electric fields.

In order to make the area of those four divided sections as equal to each other as possible, the hole is preferably formed at the center of gravity.

Figure 14C:
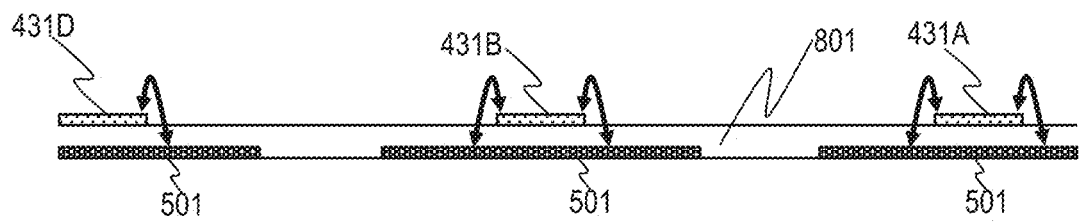
FIGS. 14C and 14D are respectively a cross-sectional view taken along the line XIVC-XIVC of FIG. 14B, and a cross-sectional view taken along the line XIVD-XIVD
Figure 14D:
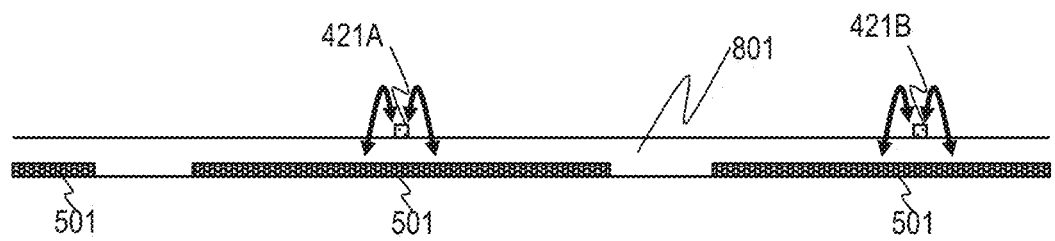

Next, the cross-sectional structure will be explained with reference to FIGS. 14C and 14D. FIGS. 14C and 14D are respectively a cross-sectional view taken along the line XIVC-XIVC of FIG. 14B, and a cross-sectional view taken along the line XIVD-XIVD.

A liquid crystal layer (not illustrated in the figure) is located at a layer above the upper driving electrode 401. The upper driving electrode 401 and the common electrode 501 are formed at different layers, having the insulating layer 801 therebetween. That is, the upper driving electrode 401 is located at a layer closer to the liquid crystal (not illustrated in the figure) as compared to the common electrode 501. FIG. 14C illustrates a cross-section of the column connector 431D, 431B, and 431A as the cross section of the upper driving electrode 401. FIG. 14D illustrates a cross-section of the row connectors 421A and 421B as the cross section of the upper driving electrode 401.

The double arrows in FIGS. 14C and 14D schematically indicate the electric field formed by the upper driving electrode 401 and the common electrode 501. As apparent from FIGS. 14C and 14D, because no electric field is formed near the holes 511A to 511C, the liquid crystal molecules located above the holes are not affected by the electric field, and keeps the initial orientation direction, which makes those liquid crystal molecules function as a wall.

As described above, with the electrode structure of Embodiment 10, it is possible to increase the number of divided sections in the pixel opening (opening region). That is, the liquid crystal molecules of the liquid crystal layer located above the holes do not move even when the pixel voltage is applied, and function as a wall. With the holes formed in a grid-like pattern, a portion where the liquid crystal molecules do not rotate is formed in a grid-like pattern in one pixel.

Specifically, by forming holes in the common electrode in positions that overlap the openings of the upper driving electrode, each opening is divided into four sections that are separately affected by different electric fields. The orientation direction of the liquid crystal molecules in adjacent divided sections differs from each other To further explain this division, one pixel has nine openings (three by three) as illustrated in FIG. 14A, and one pixel is divided into 36 sections (four by nine) separately affected by different electric fields. As a result, the response speed of the liquid crystal improves.

Embodiment 11

Figure 15A:
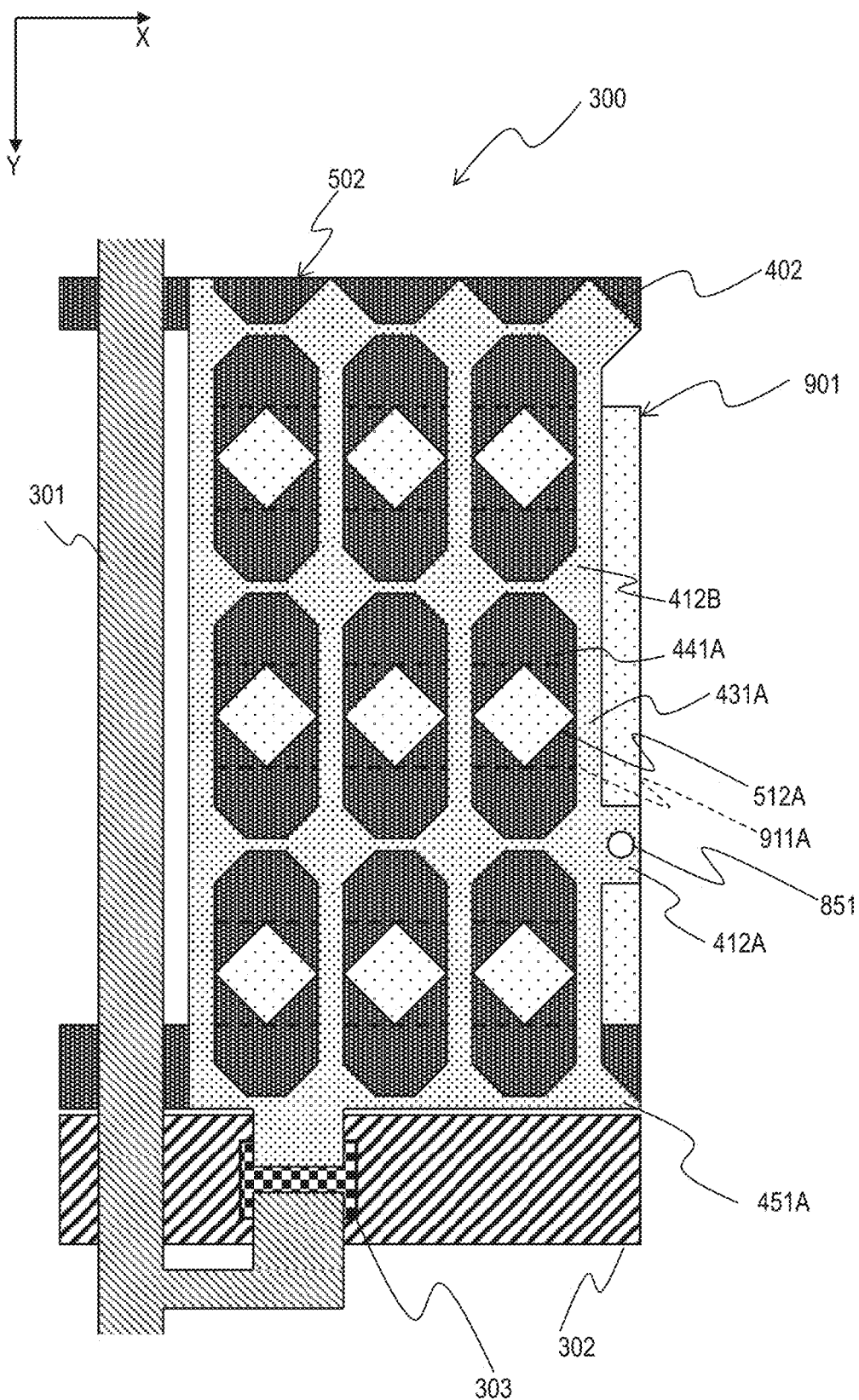
FIG. 15A is a plan view schematically illustrating the electrode structure of Embodiment 11.

FIG. 15A is a plan view schematically illustrating the electrode structure of Embodiment 11. Below, the differences from Embodiment 10 will mainly be discussed. In Embodiment 11, a lower driving electrode that is electrically connected to the upper driving electrode is added in order to increase electric field that affects the liquid crystal molecules.

In FIG. 15A, the pixel 300 of Embodiment 11 has a lower driving electrode 901 and a contact hole 851 that electrically connects the lower driving electrode 901 and the upper driving electrode 402, in addition to the configuration of the pixel 300 of Embodiment 10.

The upper driving electrode 402 of Embodiment 11 has a structure similar to the upper driving electrode 401 of Embodiment 10. The difference between the upper driving electrode 402 of Embodiment 11 and the upper driving electrode 401 of Embodiment 10 is that the structure of some of the intersections has been modified due to the addition of the lower driving electrode 901.

For example, the shape of the intersection 411A of the upper driving electrode 401 of Embodiment 10 is modified to a pentagon as in the intersection 412A. The intersection 412A is electrically connected to the lower driving electrode 901 via the contact hole 851. The shape of the intersection 411B of the upper driving electrode 401 of Embodiment 10 is modified to a triangle as in the intersection 412B.

The common electrode 502 of Embodiment 11 has a structure similar to the common electrode 501 of Embodiment 10. The difference between the common electrode 502 of Embodiment 11 and the common electrode 501 of Embodiment 10 is that the shape of the holes has been modified due to the addition of the lower driving electrode 901. The holes are formed in the row direction and the column direction at an even interval as in Embodiment 10. The shape of the hole 512 of Embodiment 11 is a rectangular, for example. In FIG. 15A, the holes are denoted with the reference characters 512A to 512C, for example. The hole may be in various shapes such as a circle and polygon.

In FIG. 15A, the shape of the holes is a square, and the two diagonal lines are parallel to the X axis and Y axis, respectively.

The lower driving electrode 901 overlaps the plurality of holes of the common electrode 502, respectively, and are applied with the driving potential. The lower driving electrode 901 has a plurality of comb tooth parts extending along the row direction or column direction. In FIG. 15A, the comb tooth part is denoted with the reference character 911A, for example. The comb tooth parts overlap the plurality of holes arranged along the direction in which the comb tooth parts extend. The width of the comb tooth part in the Y axis direction is the same as that of the length of the diagonal line of the hole in the Y axis direction.

Figure 15B:
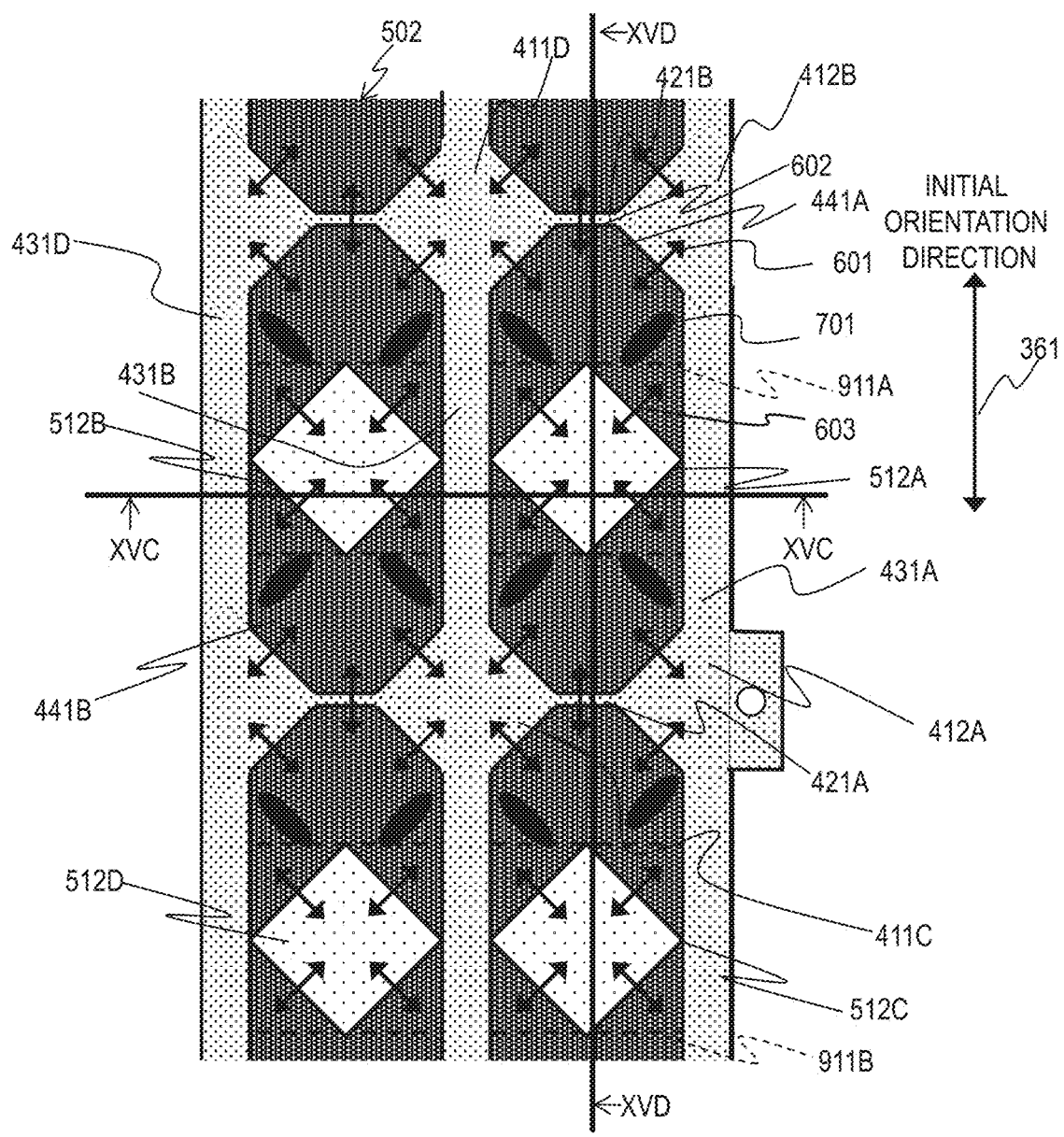
FIG. 15B is a diagram explaining the shape of the upper driving electrode, the common electrode, and the lower driving electrode, and the operation of the liquid crystal molecules in detail.

Next, with reference to FIG. 15B, the shape of the openings and the operation of the liquid crystal molecules will be explained in detail. FIG. 15B is a diagram explaining the shape of the upper driving electrode 402, the common electrode 502, and the lower driving electrode 901, and the operation of the liquid crystal molecules in detail. FIG. 15B illustrates the structure near the opening 441A of FIG. 15A. Below, the differences between Embodiment 10 and Embodiment 11 will mainly be discussed.

The comb tooth part 911A overlaps the plurality of holes 512A and 512B arranged along the comb tooth part 911A. The comb tooth part 911B overlaps the plurality of holes 512C and 512D arranged along the comb tooth part 911B.

In Embodiment 11, electric fields (such as electric field 603) are formed by the side of the hole of the common electrode 502 and the lower driving electrode 901, in addition to the electric fields 601 and 602. The electric fields 601 and 603 are wide oblique electric fields that are slanted to the X axis and Y axis, and the electric field 602 is an electric field along the Y axis (orientation axis). The oblique electric fields 601 and 603 make the liquid crystal molecules 701 around the oblique electric fields 601 and 603 oriented obliquely.

As described in Embodiment 10, with the hole 512A of the common electrode 502, the opening 441 is divided into four sections that are affected by different electric fields, respectively. In order to make the area of those four divided sections as equal to each other as possible, the hole is preferably formed at the center of gravity.

Figure 15C:
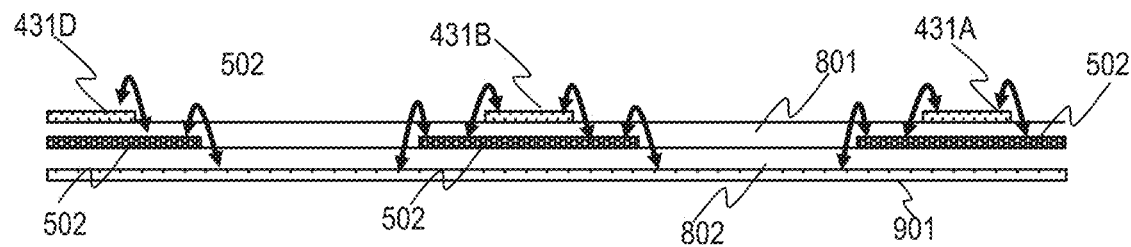
FIGS. 15C and 15D are respectively a cross-sectional view taken along the line XVC-XVC of FIG. 15B, and a cross-sectional view taken along the line XVD-XVD.
Figure 15D:
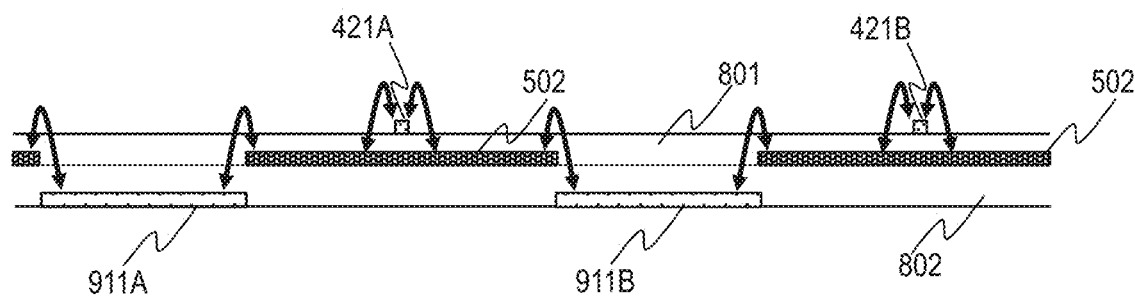

Next, the cross-sectional structure will be explained with reference to FIGS. 15C and 15D. FIGS. 15C and 15D are respectively a cross-sectional view taken along the line XVC-XVC of FIG. 15B, and a cross-sectional view taken along the line XVD-XVD.

A liquid crystal layer (not illustrated in the figure) is located at a layer above the upper driving electrode 402. The common electrode 502 and the upper driving electrode 402 are formed at different layers, having the insulating layer 801 therebetween. The lower driving electrode 901 and the common electrode 502 are formed at different layers, having the insulating layer 802 therebetween. That is, the upper driving electrode 402 is located at a layer closer to the liquid crystal (not illustrated in the figure) as compared to the common electrode 502. On the other hand, the lower driving electrode 901 is located at a layer further away from the liquid crystal (not illustrated in the figure) as compared to the common electrode 502.

FIG. 15C illustrates a cross section of the column connectors 431A, 431B, and 431D as a cross-sectional view of the upper driving electrode 401. FIG. 15D illustrates a cross section of the row connectors 421A and 421B as the cross-sectional view of the upper driving electrode 401, and a cross section of the comb-tooth parts 911A and 911B as the cross-sectional view of the lower driving electrode 901.

The double arrows in FIGS. 15C and 15D schematically indicate the electric field formed by the lower driving electrode 901 and the common electrode 502, and the electric field formed by the upper driving electrode 402 and the common electrode 502.

By forming holes in the common electrode in positions that overlap the openings of the upper driving electrode, each opening is divided into four sections that are separately affected by different electric fields. The orientation direction of the liquid crystal molecules in adjacent divided sections differs from each other To further explain this division, one pixel has nine openings (three by three) as illustrated in FIG. 15A, and one pixel is divided into 36 sections (four by nine) separately affected by different electric fields. As a result, the response speed of the liquid crystal improves.

Embodiment 12

Embodiment 12 differs from Embodiment 11 in that the number of openings in the upper driving electrode in one pixel is physically increased by modifying the shape of the upper driving electrode instead of forming holes in the common electrode.

Figure 16A:
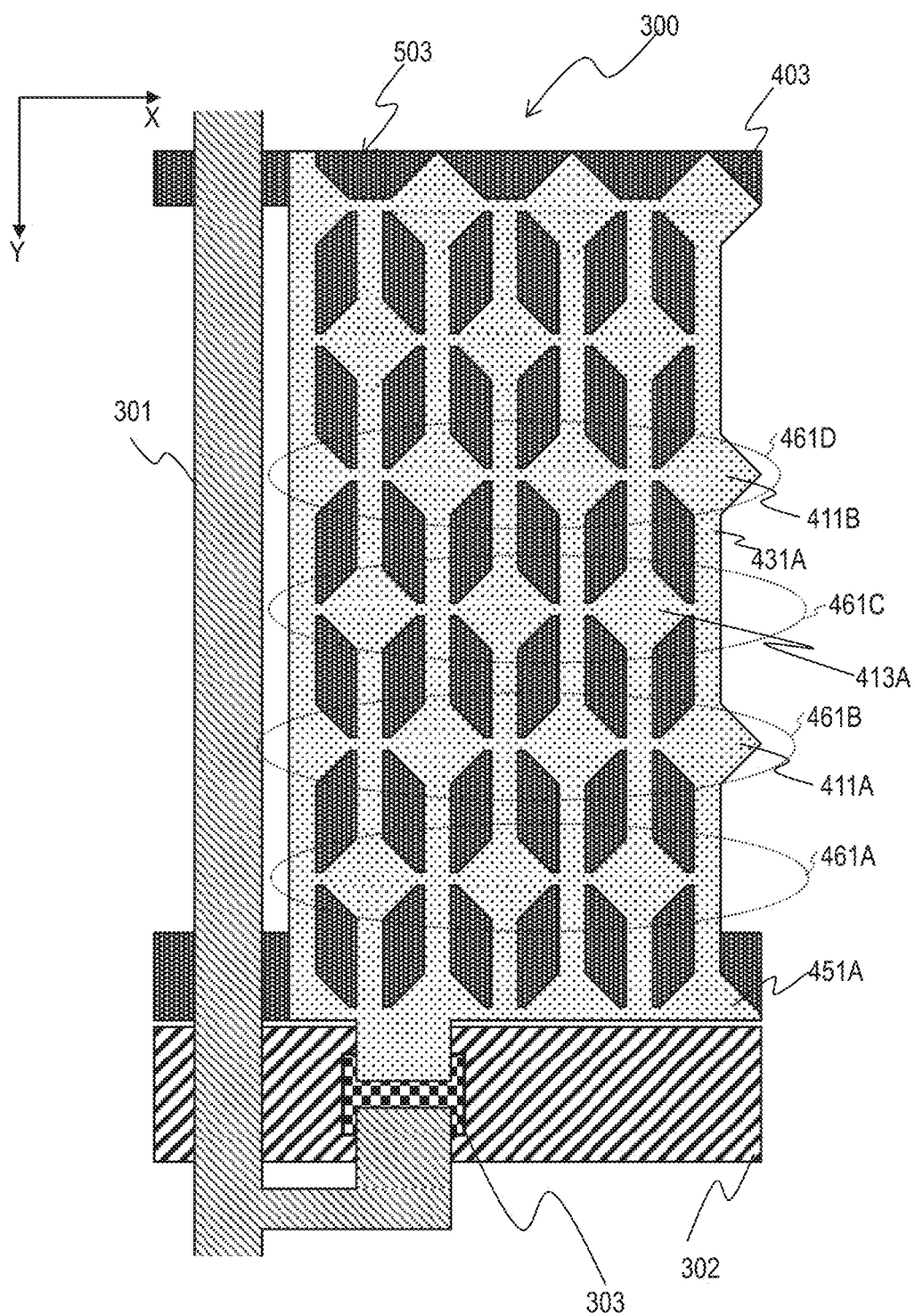
FIG. 16A is a plan view schematically illustrating the electrode structure of Embodiment 12.

FIG. 16A is a plan view schematically illustrating the electrode structure of Embodiment 12. Below, the differences from Embodiment 10 will mainly be discussed. The upper driving electrode 403 of Embodiment 12 is obtained by adding diamond-shaped intersections to the openings of the upper driving electrode 401 of Embodiment 10. In FIG. 16A, those additional intersections are denoted with the reference character 413A, for example.

The upper driving electrode 403 has a plurality of extending portions that extend along the X axis or Y axis and are separated from each other. In FIG. 16A, the extending portions extending along the X-axis are denoted with the reference characters 461A to 461D.

The plurality of extending portions include two types of extending portions. The extending portions of the first type are referred to as the first type extending portions, and the extending portions of the second type are referred to as the second type extending portions. In FIG. 16A, the first type extending portions are denoted with the reference characters 461A and 461C, and the second type extending portions are denoted with the reference characters 461B and 461D. The first type extending portion and the second type extending portion are next to each other in the Y axis direction, keeping a certain distance therebetween. For example, the first type extending portion 461A and the second type extending portion 461B are next to each other, the second type extending portion 461B and the first type extending portion 461C are next to each other, and the first type extending portion 461C and the second type extending portion 461D are next to each other. In the descriptions below, the first type extending portions and the second type extending portions will collectively be referred to as the extending portions when it is not necessary to distinguish the two.

The common electrode 503 is an electrode that is formed to cover the pixel 300 that is a unit pixel. That is, the common electrode 503 is formed in the pixel 300 continuously. Unlike Embodiments 10 and 11, the common electrode 503 does not have holes.

Figure 16B:
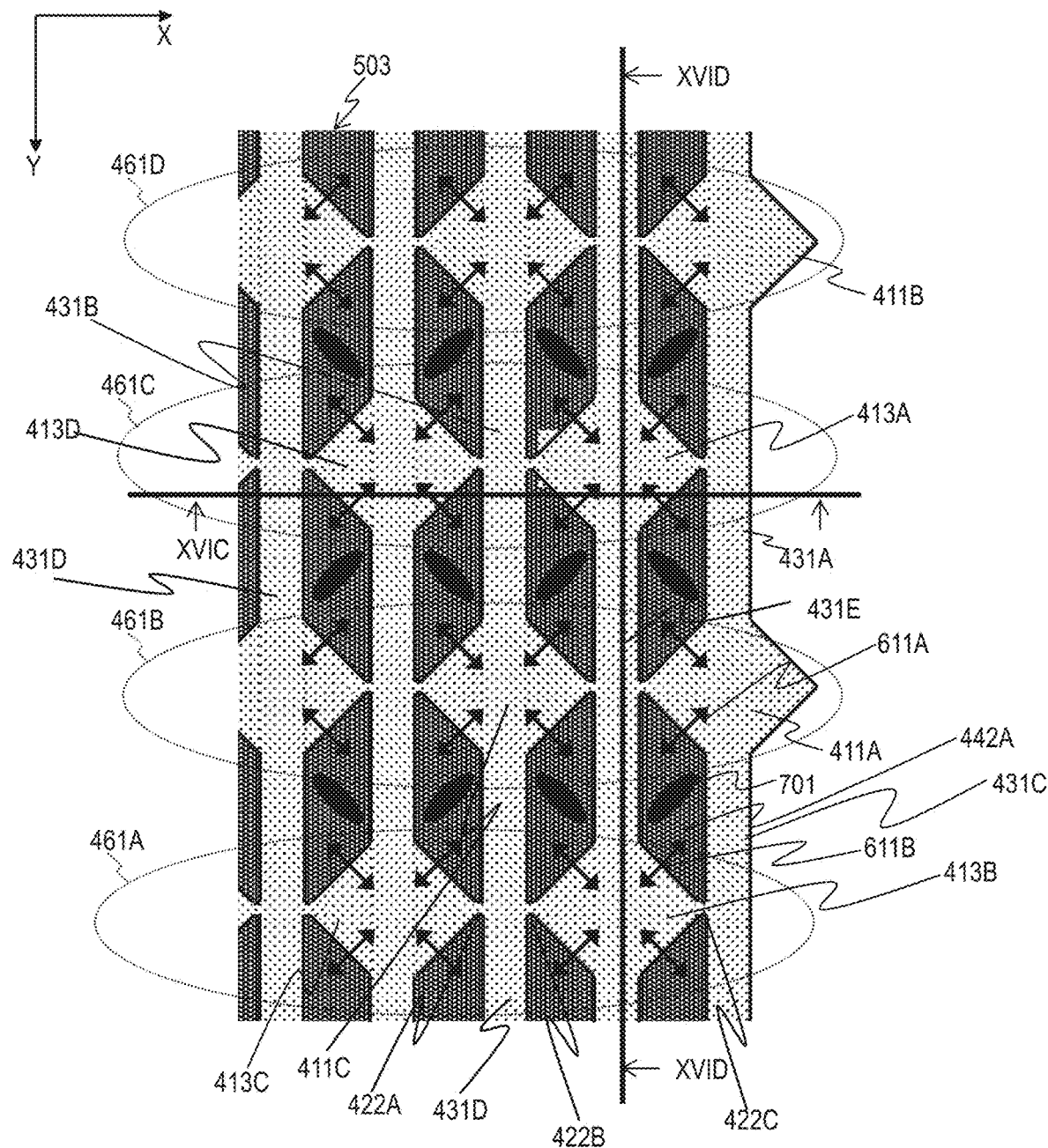
FIG. 16B is a diagram explaining the shape of the upper driving electrode and the operation of the liquid crystal molecules in detail.

With reference to FIG. 16B, the shape of the upper driving electrode 403 and the operation of the liquid crystal molecules will be explained in detail. FIG. 16B is a diagram explaining the shape of the upper driving electrode 403 and the operation of the liquid crystal molecules in detail.

Each of the plurality of extending portions has intersections lined up along the X axis, keeping a certain distance therebetween, and connectors that connect the respective intersections lined up along the X axis, keeping a certain distance therebetween.

For example, the first type extending portion 461A has intersections 413B and 413C lined up in the X axis keeping a certain distance therebetween, and connectors (422A, 431D, and 422B) that connect those intersections 413B and 413C. The intersection 413B is connected to the column connector 431D via the row connector 422B, and is further connected to the column connector 431C via the row connector 422C.

The position in the X axis direction of each intersection of the plurality of first type extending portions is the same as each other. For example, the position in the X axis direction of the intersection 413B of the first type extending portion 461A is the same as that of the intersection 413A of the first type extending portion 461C. In other words, the respective intersections of the plurality of first type extending portions are arranged on a straight line along the Y axis, and are connected to each other. The intersection 413A and the intersection 413B are connected by the column connector 431E, for example.

The position in the X axis direction of each intersection of the plurality of second type extending portions is the same as each other. For example, the position in the X axis of the intersection 411A of the first type extending portion 461B is the same as that of the intersection 411B of the second type extending portion 461D. In other words, the respective intersections of the plurality of second type extending portions are arranged on a straight line along the Y axis, and are connected to each other. The intersection 411A and the intersection 411B are connected by the column connecting portion 431A, for example.

The position in the X axis direction of the intersections of the first type extending portions differs from the position in the X axis direction of the intersections of the second type extending portions. For example, the position in the X axis direction of the intersection 413B of the first type extending portion 461A differs from the position in the X axis direction of the intersections 411A and 411C of the second type extending portion 461B.

As described above, the intersections of the plurality of first type extending portions and the intersections of the plurality of second type extending portions are arranged in a zig-zag pattern along the X axis and Y axis. The intersections 413B, 411C, and 413C are arranged in a zig-zag pattern along the X axis, for example. The intersections 413C, 411C, and 413D are arranged in a zig-zag pattern along the Y axis, for example.

Next, the operation of the electric field and liquid crystal molecules will be explained. In each opening, an electric field to rotate the liquid crystal molecules is generated. The electric field in the opening 442A at the lower right corner of FIG. 16B will be explained as an example. The opening 442A is defined by a side of the intersection 413B of the first type extending portion 461A, a side of the intersection 411A of the second type extending portion 461B, which faces the side of the intersection 413B, the column connector 431E, and the column connector 431C. The side of the intersection 411A and the common electrode 503 form a wide oblique electric field 611A that is slanted to the X axis and Y axis. The side of the intersection 413A and the common electrode 503 form a wide oblique electric field 611B that is slanted to the X axis and Y axis. Those oblique electric fields make the liquid crystal molecules around the oblique electric field (such as liquid crystal molecules 701) orientated obliquely.

It is preferable that each side of the plurality of opening be equal to each other so that the area of each opening is made equal.

Figure 16C:
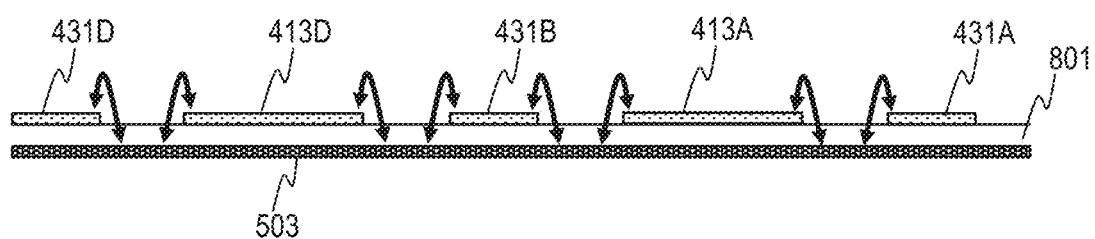
FIGS. 16C and 16D are respectively a cross-sectional view taken along the line XVIC-XVIC of FIG. 16B, and a cross-sectional view taken along the line XVID-XVID.
Figure 16D:
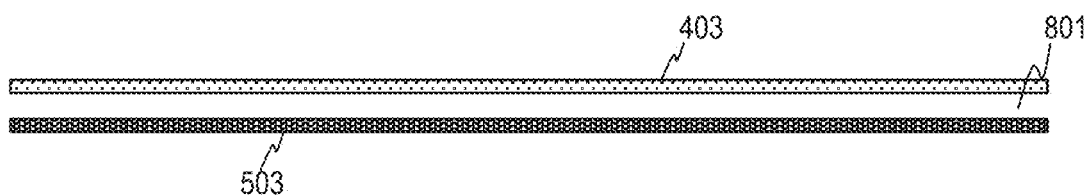

Next, the cross-sectional structure will be explained with reference to FIGS. 16C and 16D. FIGS. 16C and 16D are respectively a cross-sectional view taken along the line XVIC-XVIC of FIG. 16B, and a cross-sectional view taken along the line XVID-XVID. A liquid crystal layer (not illustrated in the figure) is located at a layer above the upper driving electrode 403.

The upper driving electrode 403 and the common electrode 503 are formed at different layers, having the insulating layer 801 therebetween. That is, the upper driving electrode 403 is located at a layer closer to the liquid crystal (not illustrated in the figure) as compared to the common electrode 503.

FIG. 16C illustrates a cross-section of the column connector 431D, the intersection 413D, the column connector 431B, the intersection 413A, and the column connector 431A as the cross-sectional view of the upper driving electrode 403.

The double arrows in FIGS. 16C and 16D schematically indicate the electric field formed by the upper driving electrode 403 and the common electrode 503.

In Embodiment 12, the number of openings in the upper driving electrode in one pixel is physically increased by modifying the shape of the upper driving electrode. In the example of FIG. 16A, one pixel has 36 openings (six by six). By increasing the number of openings, the response speed of liquid crystal improves.

Embodiment 13

In a manner similar to Embodiment 12, in Embodiment 13, the number of openings in the upper driving electrode in one pixel is physically increased by modifying the shape of the upper driving electrode instead of forming holes in the common electrode.

Figure 17A:
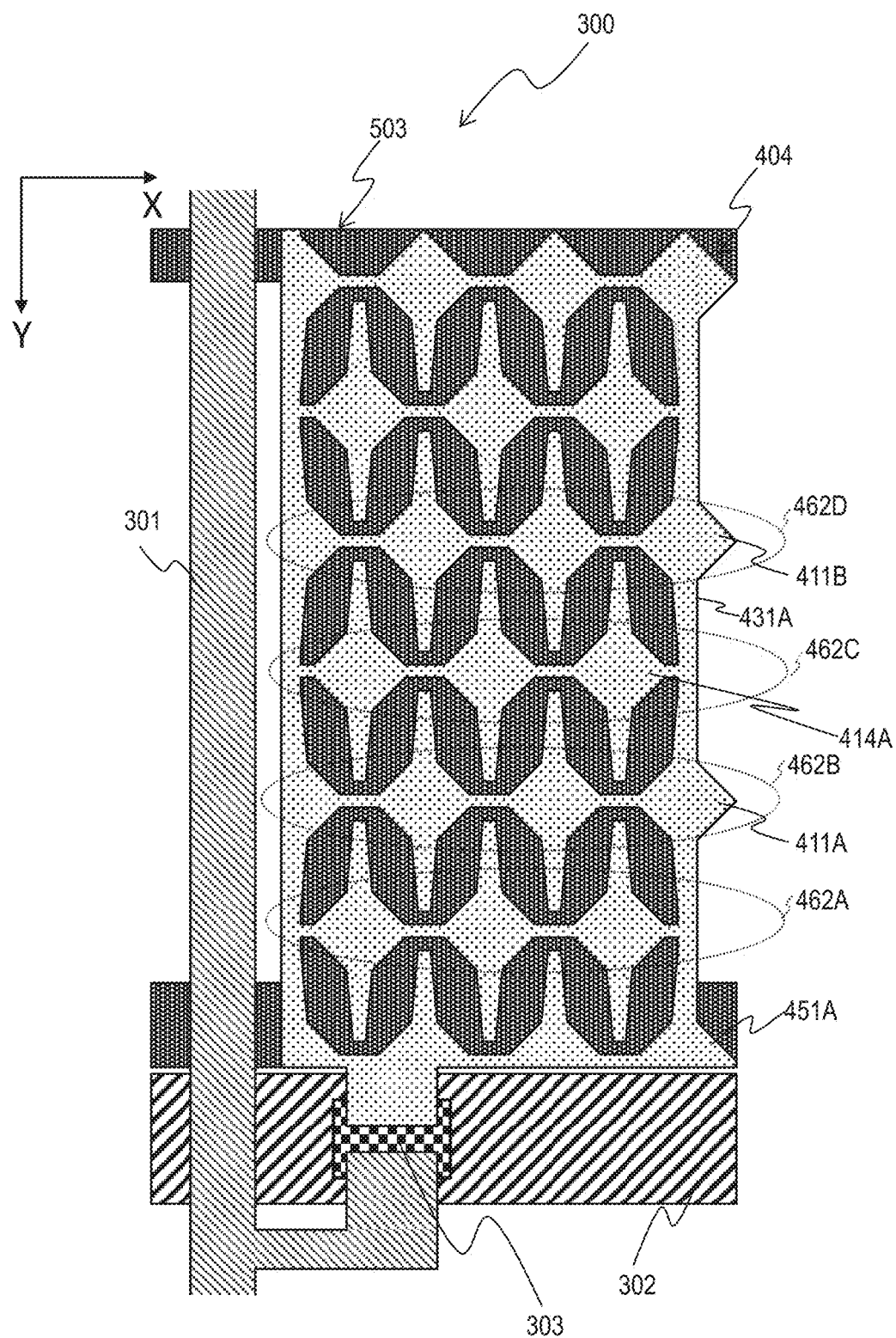
FIG. 17A is a plan view schematically illustrating the electrode structure of Embodiment 13.

FIG. 17A is a plan view schematically illustrating the electrode structure of Embodiment 13. Below, the differences from Embodiment 12 will mainly be discussed. In the upper driving electrode 404 of Embodiment 13, a plurality of intersections (modified intersections), which do not include the plurality of intersections of the leftmost column and the plurality of the intersections of the rightmost column, are not connected to each other in the column direction. In FIG. 17A, the modified intersection is denoted with the reference character 414A, for example. The plurality of intersections of the leftmost column and the plurality of the intersections of the rightmost column in FIG. 17A are the same as the plurality of intersections of the leftmost column and the plurality of the intersections of the rightmost column in the upper driving electrode 403 of FIG. 16A.

The upper driving electrode 404 has a plurality of extending portions that extend along the X axis or Y axis and are separated from each other. In FIG. 17A, the extending portions extending along the X-axis are denoted with the reference characters 462A to 462D. In a manner similar to Embodiment 12, the plurality of extending portions include the first type extending portions and the second type extending portions. In FIG. 17A, the first type extending portions are denoted with the reference characters 462A and 462C, and the second type extending portions are denoted with the reference characters 462B and 462D. The first type extending portion and the second type extending portion are next to each other in the Y axis direction.

Figure 17B:
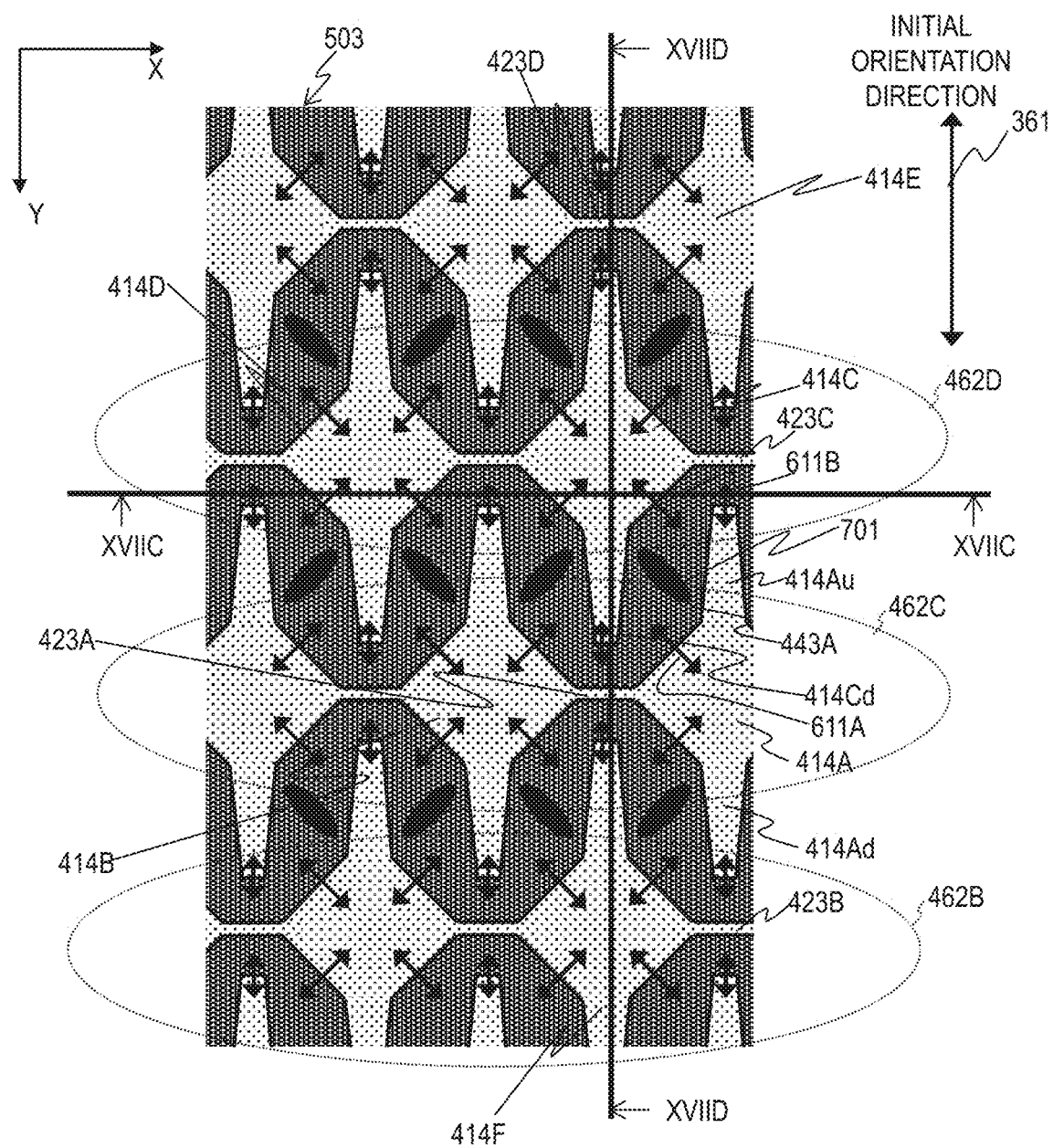
FIG. 17B is a diagram explaining the shape of the upper driving electrode and the operation of the liquid crystal molecules in detail.

With reference to FIG. 17B, the shape of the upper driving electrode 404 and the operation of the liquid crystal molecules will be explained in detail. FIG. 17B is a diagram explaining the shape of the upper driving electrode 404 and the operation of the liquid crystal molecules in detail.

The upper driving electrode 404 has a plurality of intersections, and the plurality of intersections include modified intersections 414A to 414F, for example. The modified intersections may also be simply referred to as intersections.

Below, the shape of the modified intersection will be explained using the modified intersection 414A as an example. The modified intersection 414A is connected to the adjacent modified intersection 414B via the row connector 423A in the X-axis direction. Below, the Y axis arrow direction (downward direction in the diagram) is referred to as the first direction, and the direction opposite to the first direction (upward direction in the diagram, for example) is referred to as the second direction.

The modified intersection 414A has a first protruding portion 414Ad that extends in the first direction of the Y axis and that is not connected to the connector 423B of the extending portion 462B arranged next to the modified intersection 414A in the first direction. The modified intersection 414A has a second protruding portion 414Au that extends in the second direction of the Y axis and that is not connected to the connecting portion 423C of the extending portion 462D arranged next to the modified intersection 414A in the second direction.

As described above, the intersections of the plurality of first type extending portions and the intersections of the plurality of second type extending portions are arranged in a zig-zag pattern along the X axis and Y axis. The intersections 414A, 414C, 414B, and 414D are arranged in a zig-zag pattern along the X axis, for example. The intersections 414F, 414A, 414C, and 414E are arranged in a zig-zag pattern along the Y axis, for example.

Next, the operation of the electric field and liquid crystal molecules will be explained. In each opening, an electric field to rotate the liquid crystal molecules is generated. The electric field in the opening 443A near the modified intersection 414A will be explained as an example. The opening 443A is defined by a side of the modified intersection 414A of the first type extending portion 462C, the second protruding portion 414Au of the modified intersection 414A, a side of the modified intersection 414C of the second type extending portion 462D, which faces the side of the modified intersection 414A, the first protruding portion 414Cd of the modified intersection 414C, the row connector 423A, and the row connector 423C. The side of the modified intersection 414A and the common electrode 503 form a wide oblique electric field 611A that is slanted to the X axis and Y axis. The side of the intersection 414C and the common electrode 503 form a wide oblique electric field 611B that is slanted to the X axis and Y axis. Those oblique electric fields make the liquid crystal molecules around the oblique electric field (such as liquid crystal molecules 701) orientated obliquely. The sides of the first protruding portion and the second protruding portion of the modified intersection and the common electrode 503 form an electric field along the Y axis.

It is preferable that each side of the plurality of opening be equal to each other so that the area of each opening is made equal.

Figure 17C:
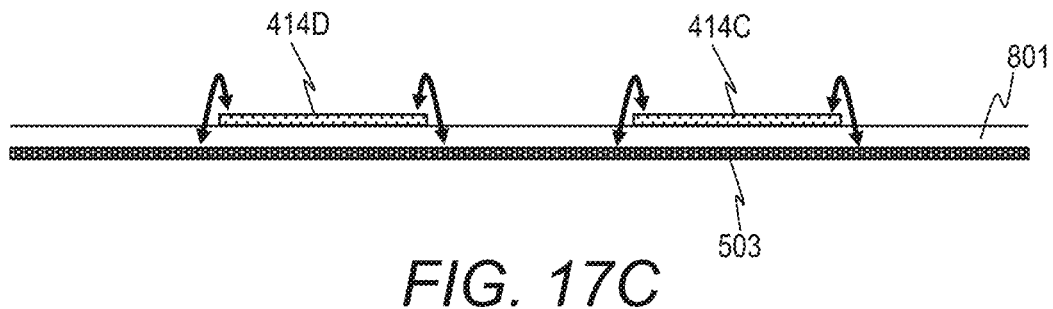
FIGS. 17C and 17D are respectively a cross-sectional view taken along the line XVIIC-XVIIC of FIG. 17B, and a cross-sectional view taken along the line XVIID-XVIID.
Figure 17D:
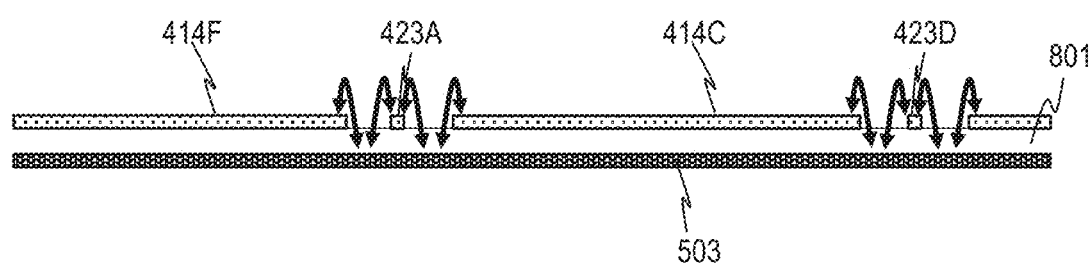

Next, the cross-sectional structure will be explained with reference to FIGS. 17C and 17D. FIGS. 17C and 17D are respectively a cross-sectional view taken along the line XVIIC-XVIIC of FIG. 17B, and a cross-sectional view taken along the line XVIID-XVIID. A liquid crystal layer (not illustrated in the figure) is located at a layer above the upper driving electrode 404.

The upper driving electrode 404 and the common electrode 503 are formed at different layers, having the insulating layer 801 therebetween. A liquid crystal layer (not illustrated in the figure) is located at a layer above the upper driving electrode 404. In FIG. 17C, a cross section of the modified intersections 414D and 414C is illustrated as the cross-sectional view of the upper driving electrode 404, and in FIG. 17D, a cross section of the modified intersection 414F, the row connector 423A, the modified intersection 414C, and the row connector 423D is illustrated as the cross-sectional view of the upper driving electrode 404. The double arrows in FIGS. 17C and 17D schematically indicate the electric field formed by the upper driving electrode 404 and the common electrode 503.

In Embodiment 13, the number of openings in the upper driving electrode in one pixel is physically increased by modifying the shape of the upper driving electrode, in a manner similar to Embodiment 12. By increasing the number of openings, the response speed of liquid crystal improves.

Embodiment 14

Figure 18A:
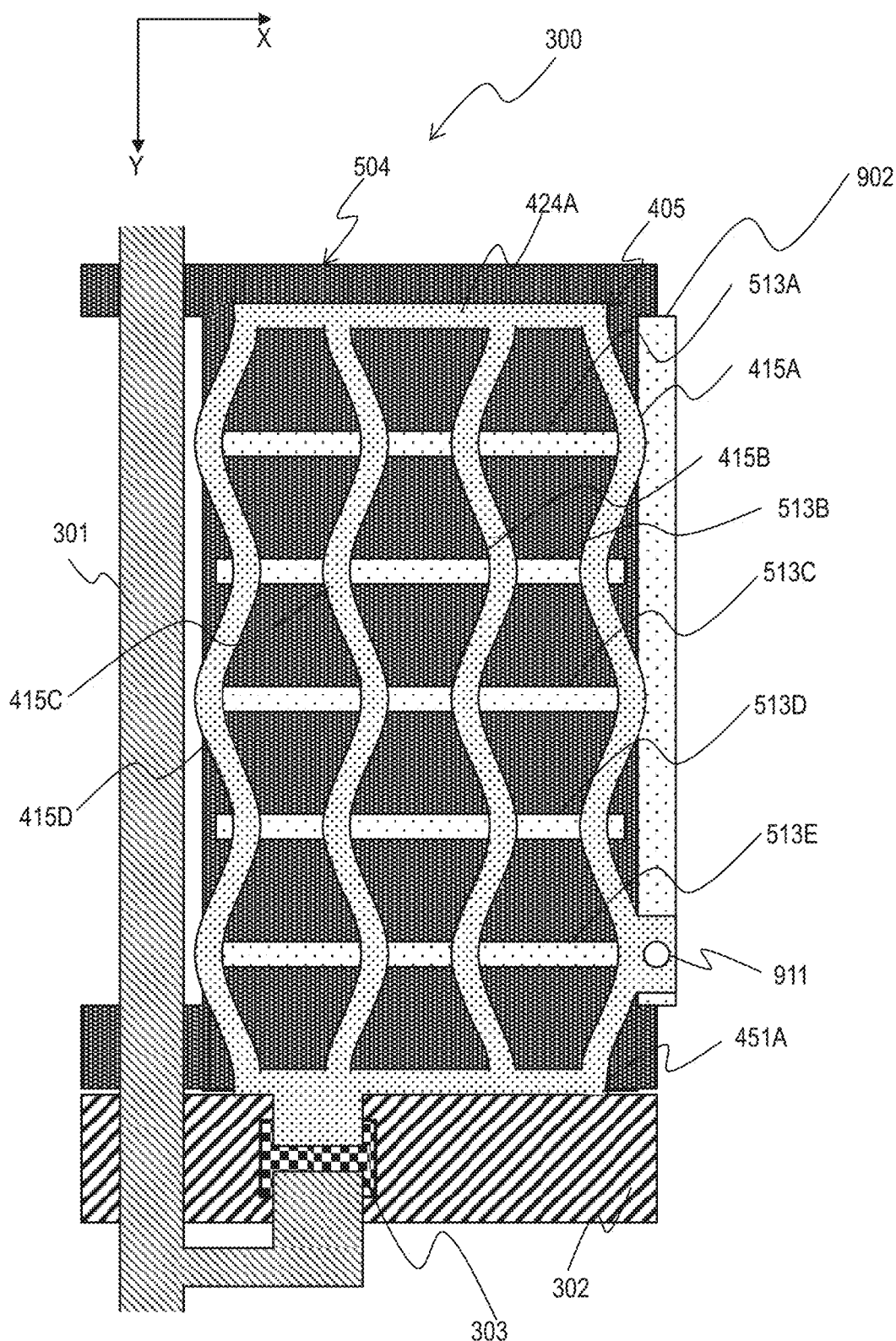
FIG. 18A is a plan view schematically illustrating the electrode structure of Embodiment 14.

FIG. 18A is a plan view schematically illustrating the electrode structure of Embodiment 14. Below, the differences from Embodiment 11 will mainly be discussed.

The upper driving electrode 405 includes a plurality of waving extending portions that extend along the Y axis and that are separated from each other along the X axis. In FIG. 18A, the waving extending portions are denoted with the reference characters 415A to 415D, for example. The respective waving extending portions 415A to 415D extend along the Y axis toward the second direction (upward direction in the diagram) from the base part 451A. The respective waving extending portions 415A to 415D are connected to the row connector 424A. The upper driving electrode 405 is electrically connected to the lower driving electrode 902 via the contact hole 851.

The common electrode 504 is an electrode that is formed to cover the pixel 300 that is a unit pixel. That is, the common electrode 504 is formed in the pixel 300 continuously. The common electrode 504 includes a plurality of openings that open up along the X axis and that are arranged at a certain interval along the Y axis. The longer sides of the opening are along the X axis direction, and the shorter sides of the opening are along the Y axis direction. In FIG. 18A, the openings are denoted with the reference characters 513A to 513E, for example. The openings are arranged along the Y axis at a certain interval.

The lower driving electrode 902 is an electrode that is formed to cover the pixel 300 that is a unit pixel. That is, the lower driving electrode 902 is formed in the pixel 300 continuously. FIG. 18A schematically illustrates a state in which part of the lower driving electrode 902 is exposed through the openings 513A to 513E.

Figure 18B:
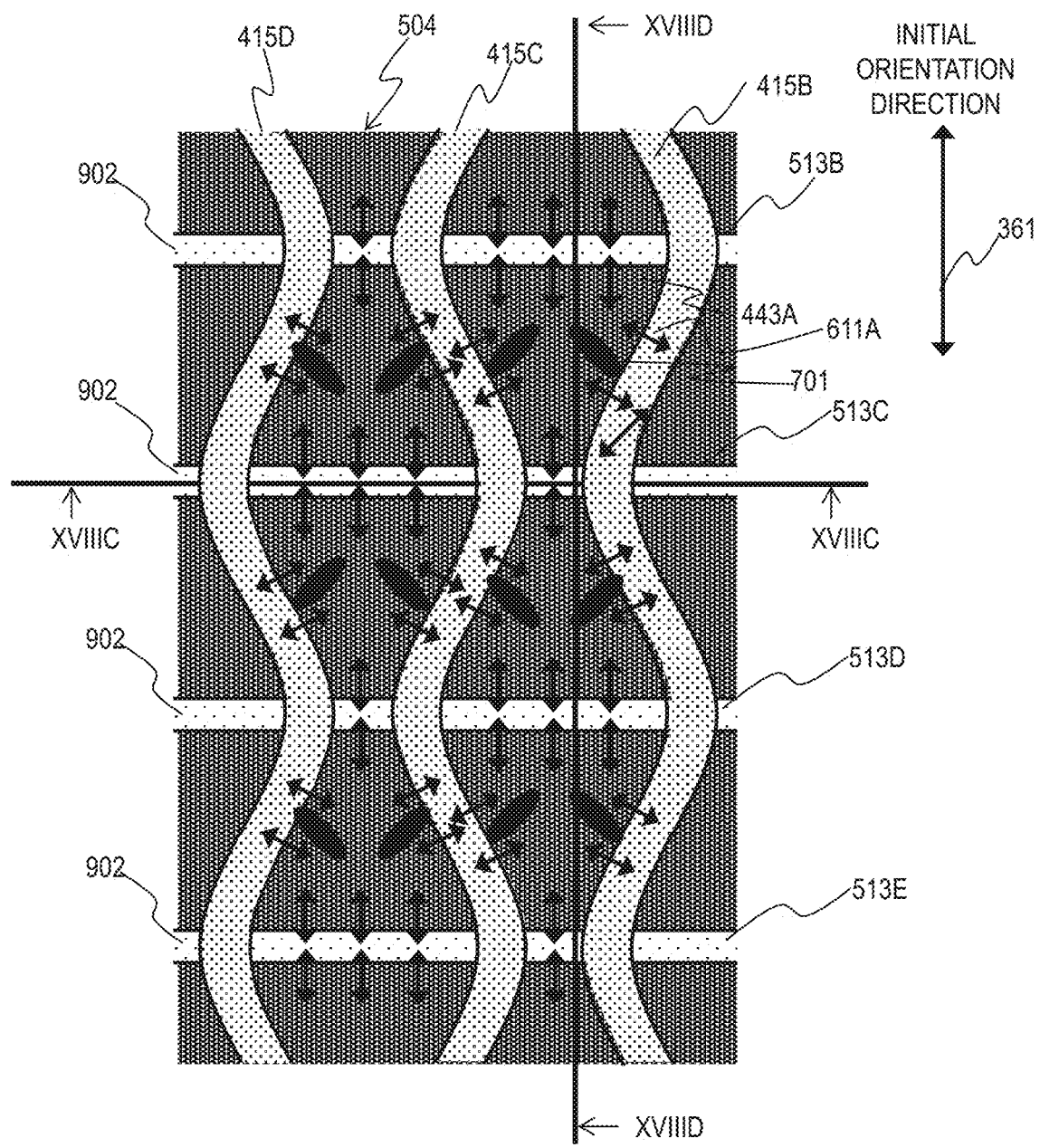
FIG. 18B is a diagram explaining the operation of the liquid crystal molecules in detail.

With reference to FIG. 18B, the operation of the liquid crystal molecules will be explained in detail. FIG. 18B is a diagram explaining the operation of the liquid crystal molecules in detail. The electric field in the opening 443A near the waving extending portion 415B will be explained as an example. The opening 443A is defined by the waving extending portion 415B, the waving extending portion 415C, and the openings 513B and 513C of the common electrode 504. The waving extending portion and the common electrode 504 form a wide oblique electric field 611A that is slanted to the X axis and Y axis. The oblique electric field 611A is formed by the waving extending portion 415B and the common electrode 504, for example. Those oblique electric fields make the liquid crystal molecules around the oblique electric field (such as liquid crystal molecules 701) orientated obliquely. The common electrode 504 and the lower driving electrode 902 form an electric field along the Y axis.

Figure 18C:
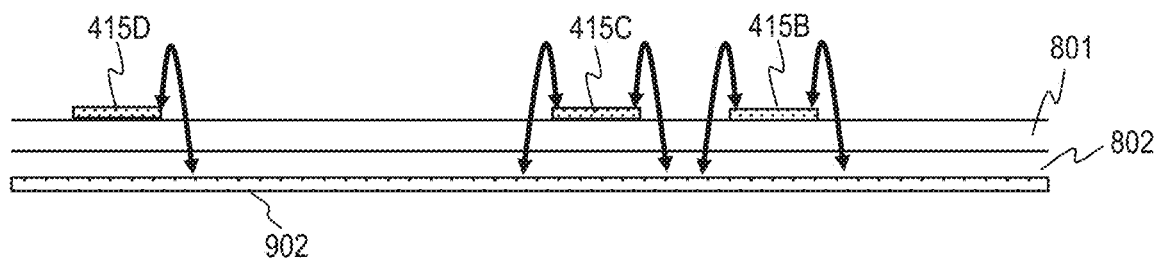
FIGS. 18C and 18D are respectively a cross-sectional view taken along the line XVIIIC-XVIIIC of FIG. 18B, and a cross-sectional view taken along the line XVIIID-XVIIID.
Figure 18D:
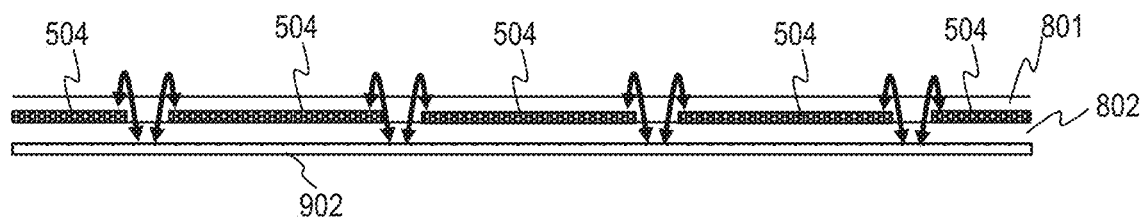

Next, the cross-sectional structure will be explained with reference to FIGS. 18C and 18D. FIGS. 18C and 18D are respectively a cross-sectional view taken along the line XVIIIC-XVIIIC of FIG. 18B, and a cross-sectional view taken along the line XVIIID-XVIIID. A liquid crystal layer (not illustrated in the figure) is located at a layer above the upper driving electrode 405.

The common electrode 504 and the upper driving electrode 405 are formed at different layers, having the insulating layer 801 therebetween. The common electrode 503 and the lower driving electrode 902 are formed at different layers, having the insulating layer 802 therebetween. That is, the upper driving electrode 405 is located at a layer closer to the liquid crystal (not illustrated in the figure) as compared to the common electrode 504. On the other hand, the lower driving electrode 902 is located at a layer further away from the liquid crystal (not shown in the figure) as compared to the common electrode 504.

FIG. 18C illustrates a cross section of the waving extending portions 415D, 415C, and 415B as the cross-sectional view of the upper driving electrode 405. The double arrows in FIGS. 18C and 18D schematically indicate the electric field formed by the upper driving electrodes 405 and common electrode 504.

In Embodiment 14, the number of openings in the upper driving electrode in one pixel is physically increased by modifying the shape of the upper driving electrode. In the example of FIG. 18A, one pixel has 18 openings (six by three). By increasing the number of openings, the response speed of liquid crystal improves.

As set forth above, embodiments of the present disclosure have been described; however, the present disclosure is not limited to the foregoing embodiments. Those skilled in the art can easily modify, add, or convert each element in the foregoing embodiment within the scope of the present disclosure. A part of the configuration of one embodiment can be replaced with a configuration of another embodiment or a configuration of an embodiment can be incorporated into a configuration of another embodiment.

What is claimed is:

1. A liquid crystal display device, comprising:
an element substrate;
an opposite substrate facing the element substrate;
liquid crystal sandwiched between the element substrate and the opposite substrate; and
a plurality of electrode sets formed on a surface of the element substrate facing the liquid crystal, the plurality of electrode sets being configured to apply an electric field to each pixel region of the liquid crystal,
wherein each of the plurality of electrode sets includes:
a plurality of first electrodes extending along an orientation axis of the liquid crystal and arranged along a second axis perpendicular to the orientation axis at a certain interval;
a plurality of second electrodes extending along the orientation axis and arranged along the second axis so that the plurality of second electrodes and the plurality of first electrodes alternately line up at a certain interval;
a plurality of third electrodes extending along the second axis and arranged along the orientation axis at a certain interval; and
a plurality of fourth electrodes extending along the second axis and arranged along the orientation axis so that the plurality of fourth electrodes and the plurality of third electrodes alternately line up at a certain interval,
wherein a driving potential is given to the plurality of first electrodes and the plurality of third electrodes, respectively,
wherein a common potential is given to the plurality of second electrodes and the plurality of fourth electrodes, respectively,
wherein each of the plurality of third electrodes is located at a layer closer to the liquid crystal as compared to the plurality of second electrodes, and intersects with one of the plurality of second electrodes through an insulating layer,
wherein each of the plurality of fourth electrodes is located at a layer closer to the liquid crystal as compared to the plurality of first electrodes, and intersects with one of the plurality of first electrodes though an insulating layer,
wherein a width of the third electrodes is the same as each other at respective intersections of the plurality of the third electrodes and the plurality of the second electrodes, and
wherein a width of the fourth electrodes is the same as each other at respective intersections of the plurality of the fourth electrodes and the plurality of the first electrodes.

2. The liquid crystal display device according to claim 1,
wherein the plurality of first electrodes, the plurality of second electrodes, the plurality of third electrodes, and the plurality of fourth electrodes define a plurality of sections, respectively, and
wherein each of the plurality of sections includes two opposing sides extending along the orientation axis, and two opposing sides extending in a slanted manner with respect to the orientation axis and the second axis.

3. The liquid crystal display device according to claim 2,
wherein at least one of the first electrode and the third electrode includes a plurality of first portions and a plurality of second portions arranged alternately in a first direction that is an extending direction of said at least one of the first electrode and the third electrode,
wherein each of the plurality of first portions is made up of four sides each of which is one of the two opposing sides extending in a slanted manner with respect to the orientation axis and the second axis,
wherein the plurality of second portions are each in a linear shape extending along the first direction and have the same width as each other;
wherein at least one of the second electrode and the fourth electrode includes a plurality of third portions and a plurality of fourth portions arranged alternately in the second direction that is an extending direction of said at least one of the second electrode and the fourth electrode,
wherein each of the plurality of third portions is made up of four sides each of which is one of the two opposing sides extending in a slanted manner with respect to the orientation axis and the second axis, and
wherein the plurality of fourth portions are each in a linear shape extending along the second direction and have the same width as each other.

4. The liquid crystal display device according to claim 2,
wherein the plurality of first electrodes are each in a linear shape and have the same width as each other,
wherein the plurality of second electrodes are each in a linear shape and have the same width as each other,
wherein each of the plurality of third electrodes includes a plurality of first portions and a plurality of second portions that are alternately arranged along the second axis,
wherein each of the plurality of first portions is made up of four sides each of which is one of said two opposing sides extending in a slanted manner with respect to the orientation axis and the second axis,
wherein the plurality of second portions are each in a linear shape extending along the second direction and have the same width as each other;
wherein each of the plurality of fourth electrodes includes a plurality of third portions and a plurality of fourth portions that are alternately arranged along the second axis,
wherein each of the plurality of third portions is made up of four sides each of which is one of said two opposing sides extending in a slanted manner with respect to the orientation axis and the second axis, and
wherein the plurality of fourth portions are each in a linear shape extending along the second direction and have the same width as each other.

5. The liquid crystal display device according to claim 1,
wherein the plurality of first electrodes and the plurality of third electrodes are located at the same layer, and
wherein the plurality of first electrodes are continuous to the plurality of third electrodes at respective intersections.

6. The liquid crystal display device according to claim 1,
wherein each of the plurality of third electrodes is a floating electrode located at a layer above the plurality of first electrodes,
wherein an area of the plurality of third electrodes respectively overlapping the plurality of first electrodes is greater than an area of the plurality of third electrodes respectively overlapping the plurality of second electrodes and an area of the plurality of third electrodes respectively overlapping the plurality of fourth electrodes, and wherein the plurality of third electrodes are given the driving potential via the plurality of first electrodes.

7. The liquid crystal display device according to claim 1, wherein each of the plurality of third electrodes is physically connected to at least one of the plurality of first electrodes via an interlayer connector formed at an intersection with said at least one of the plurality of first electrodes.

8. The liquid crystal display device according to claim 1, wherein the plurality of first electrodes and the plurality of second electrodes are located at the same layer.

9. The liquid crystal display device according to claim 1, wherein the plurality of first electrodes are each in a linear shape and have the same width as each other, wherein the plurality of second electrodes are each in a linear shape and have the same width, and wherein the plurality of first electrodes and the plurality of second electrodes are located at different layers.

10. A liquid crystal display device, comprising:

liquid crystal; and a plurality of electrode sets configured to apply an electric field to each pixel region of the liquid crystal, wherein each of the plurality of electrode sets includes a first electrode given a driving potential, and a second electrode arranged to overlap the first electrode through an insulating layer, the second electrode being given a common potential, wherein the first electrode includes:

a plurality of intersections arranged in a matrix at a certain interval;

row connectors each connecting two intersections arranged along a row direction at a certain interval;

column connectors each connecting two intersections arranged along a column direction at a certain interval; and an opening defined by the intersections, the row connectors, and the column connectors, and wherein the second electrode has a plurality of holes each corresponding in position to the opening.

11. The liquid crystal display device according to claim 10, wherein the first electrode has a plurality of said openings, and wherein each of the plurality of openings is defined by:

a first intersection and a second intersection arranged next to each other in the column direction;

a third intersection and a fourth intersection arranged next to each other in the column direction, and arranged next to the first and second intersections, respectively, in the row direction;

a first column connector connecting the first and second intersections;

a second column connector connecting the third and fourth intersections;

a first row connector connecting the first and third intersections; and a second row connector connecting the second and fourth intersections.

12. The liquid crystal display device according to claim 10, further comprising a third electrode overlapping the plurality of holes of the second electrode, the third electrode being applied with a driving potential, wherein the third electrode is located at a layer further away from the liquid crystal as compared to the second electrode.

13. The liquid crystal display device according to claim 12, wherein the third electrode has a plurality of comb tooth portions extending along the row direction or column direction, and wherein each of the comb tooth portions overlaps the plurality of holes arranged along the comb tooth portion.

14. The liquid crystal display device according to claim 10, wherein the holes of the second electrode are each formed at the center of gravity in the opening.

15. A liquid crystal display device, comprising:

liquid crystal; and a plurality of electrode sets configured to apply an electric field to each pixel region of the liquid crystal, wherein each of the plurality of electrode sets includes a first electrode given a driving potential and a second electrode arranged to overlap the first electrode through an insulating layer, the second electrode being given a common potential, wherein the first electrode includes a plurality of extending portions that extend along a first axis that is parallel to an orientation axis of liquid crystal or a second axis perpendicular to the first axis, the plurality of extending portions being arranged at a certain interval, wherein each of the plurality of extending portions has intersections arranged next to each other in the second axis direction at a certain interval, and connectors that connect the respective intersections arranged next to each other at a certain interval, wherein respective intersections of a plurality of first type extending portions included in said plurality of extending portions are arranged on a straight line along the first axis, wherein respective intersections of a plurality of second type extending portions included in said plurality of extending portions are arranged on a straight line along the first axis, wherein the position of the intersections of the first type extending portions on the second axis does not coincide with the position of the intersections of the second type extending portions on the second axis, and wherein the first type extending portions and the second type extending portions are alternately arranged in the first axis direction.

16. The liquid crystal display device according to claim 15, wherein the plurality of intersections are arranged on a straight line along the first axis, and respective intersections arranged next to each other on the straight line with at certain interval are connected by the connectors.

17. The liquid crystal display device according to claim 15, wherein at least one intersection of the plurality of intersections includes:

a first protruding portion that extends toward a first direction of the first axis, the first protruding portion being not connected to a connector of an extending portion located next to said intersection in the first direction, and a second protruding portion that extends toward a second direction opposite to the first direction of the first axis, the second protruding portion being not connected to a connector of an extending portion located next to said intersection in the second direction.

18. A liquid crystal display device, comprising:

liquid crystal; and a plurality of electrode sets configured to apply an electric field to each pixel region of the liquid crystal, wherein each of the plurality of electrode sets includes a first electrode given a driving potential, a second electrode arranged to overlap the first electrode through an insulating layer and given a common potential, and a third electrode given a driving potential, wherein the first electrode is located at a layer closer to the liquid crystal as compared to the second electrode, wherein the first electrode includes a plurality of waving extending portions that extend along a first axis, the waving extending portions being arranged at a certain interval along the second axis, wherein the second electrode includes a plurality of openings extending along the second axis, the openings being arranged at a certain interval along the first axis, and wherein the third electrode is located at a layer further away from the liquid crystal as compared to the second electrode.

* * * * *